US011541960B2

(12) United States Patent
Ying et al.

(10) Patent No.: US 11,541,960 B2
(45) Date of Patent: Jan. 3, 2023

(54) MAN-MACHINE INTERACTION SOMATOSENSORY VEHICLE

(71) Applicant: HANGZHOU CHIC INTELLIGENT TECHNOLOGY CO., LTD, Zhejiang (CN)

(72) Inventors: Jiawei Ying, Zhejiang (CN); Keping Xiao, Zhejiang (CN)

(73) Assignee: HANGZHOU CHIC INTELLIGENT TECHNOLOGY CO., LTD, Zhejiang (CN)

( * ) Notice: Subject to any disclaimer, the term of this patent is extended or adjusted under 35 U.S.C. 154(b) by 599 days.

(21) Appl. No.: 16/475,382

(22) PCT Filed: Jul. 12, 2017

(86) PCT No.: PCT/CN2017/092610
§ 371 (c)(1),
(2) Date: Jul. 2, 2019

(87) PCT Pub. No.: WO2018/126635
PCT Pub. Date: Jul. 12, 2018

(65) Prior Publication Data
US 2019/0337585 A1 Nov. 7, 2019

(30) Foreign Application Priority Data

Jan. 4, 2017 (CN) .......................... 201710005991.6
Jan. 4, 2017 (CN) .......................... 201710005993.5
(Continued)

(51) Int. Cl.
*B62M 6/50* (2010.01)
*B62K 11/00* (2006.01)
(Continued)

(52) U.S. Cl.
CPC ............. *B62M 6/50* (2013.01); *B62K 11/007* (2016.11); *B62K 11/02* (2013.01); *B62K 23/08* (2013.01);
(Continued)

(58) Field of Classification Search
CPC ......... B62K 11/007; B62K 23/08; B62M 6/90
(Continued)

(56) References Cited

U.S. PATENT DOCUMENTS 6,288,505 B1 * 9/2001 Heinzmann .......... B62K 11/007
318/139
6,408,240 B1 * 6/2002 Morrell .................. A63C 17/12
180/197

(Continued)

FOREIGN PATENT DOCUMENTS

| CN | 102013208632 | 11/2013 |
| CN | 105667660 | 6/2016 |

(Continued)

OTHER PUBLICATIONS

"International Search Report (Form PCT/ISA/210) of PCT/CN2017/092610," dated Oct. 25, 2017, with English translation thereof, pp. 1-6.

*Primary Examiner* — Jacob B Meyer
*Assistant Examiner* — Myles A Harris
(74) *Attorney, Agent, or Firm* — JCIPRNET

(57) ABSTRACT

A man-machine interaction somatosensory vehicle includes a vehicle body and two wheels provided on the vehicle body. The wheels are able to rotate around the vehicle body in a radial direction. The vehicle body further comprising a supporting frame, two pedal devices provided on the supporting frame, a control device, and a driving device for driving the wheels. The supporting frame is of an integral structure and being rotatably connected to the wheels. The (Continued)

pedal devices includes a pedal foot board and a first position sensor located between the pedal foot board and the supporting frame and used for sensing the stress information on the pedal devices. The control device controls, according to the stress information on the two pedal devices, the driving device to drive the wheels to move or steer.

22 Claims, 17 Drawing Sheets

(30) Foreign Application Priority Data

Jan. 4, 2017 (CN) .......................... 201710006181.2
Jan. 4, 2017 (CN) .......................... 201710006953.2

(51) Int. Cl.
  *B62K 23/08* (2006.01)
  *B62M 6/90* (2010.01)
  *B62K 11/02* (2006.01)
  *B62M 7/12* (2006.01)

(52) U.S. Cl.
  CPC ................ *B62M 6/90* (2013.01); *B62M 7/12* (2013.01); *B62K 2202/00* (2013.01)

(58) Field of Classification Search
  USPC .......................................... 180/21, 7.1, 218
  See application file for complete search history.

(56) References Cited

U.S. PATENT DOCUMENTS

| | | | | |
|---|---|---|---|---|
| 7,178,614 B2* | 2/2007 | Ishii | ..................... | B60K 1/02 180/7.1 |
| 7,363,993 B2* | 4/2008 | Ishii | ..................... | B62D 37/00 180/7.1 |
| 7,958,956 B2* | 6/2011 | Kakinuma | ..................... | A63C 17/12 180/65.1 |
| 8,374,774 B2* | 2/2013 | Doi | ..................... | B60L 15/20 701/124 |
| 9,592,875 B2* | 3/2017 | Takeda | ..................... | B62K 11/007 |
| 9,745,013 B2* | 8/2017 | Wood | ..................... | G01G 19/12 |
| 9,896,146 B2* | 2/2018 | Lu | ..................... | B62K 11/007 |
| 10,059,397 B2* | 8/2018 | Zheng | ..................... | B62K 3/002 |
| 10,144,477 B2* | 12/2018 | Lankford | ..................... | B62K 3/002 |
| 10,144,478 B2* | 12/2018 | Ying | ..................... | B62K 11/007 |
| 10,252,724 B2* | 4/2019 | Edney | ..................... | B62K 23/08 |
| 10,421,006 B1* | 9/2019 | Li | ..................... | A63C 17/0093 |
| 10,583,886 B2* | 3/2020 | Li | ..................... | B62K 11/007 |
| 2003/0205419 A1* | 11/2003 | Kamen | ..................... | B62D 57/00 180/21 |
| 2003/0226698 A1* | 12/2003 | Kamen | ..................... | A61G 5/048 180/65.1 |
| 2004/0007399 A1* | 1/2004 | Heinzmann | ..................... | B60L 58/22 180/7.1 |
| 2006/0260862 A1* | 11/2006 | Nishikawa | ..................... | B62K 17/00 180/315 |
| 2016/0129963 A1* | 5/2016 | Ying | ..................... | B62K 11/007 180/6.5 |
| 2017/0183053 A1* | 6/2017 | Zeng | ..................... | B62K 11/007 |
| 2018/0148120 A1* | 5/2018 | Yang | ..................... | B62K 1/00 |

FOREIGN PATENT DOCUMENTS

| | | | |
|---|---|---|---|
| CN | 105774991 | | 7/2016 |
| CN | 205554419 | | 9/2016 |
| CN | 106080936 A | * | 11/2016 |
| CN | 106114715 A | * | 11/2016 |
| CN | 205686537 | | 11/2016 |
| CN | 106314640 A | * | 1/2017 |
| CN | 106364623 A | * | 2/2017 |
| CN | 106394760 A | * | 2/2017 |
| CN | 106627896 | | 5/2017 |
| CN | 106828726 | | 6/2017 |
| CN | 106828727 | | 6/2017 |
| CN | 106828728 | | 6/2017 |
| DE | 104029769 | | 11/2015 |
| KR | 20100111449 A | * | 10/2010 |
| WO | WO-2018161947 A1 | * | 9/2018 ............. B62M 6/50 |

* cited by examiner ated sensor inside the vehicle body to detect the change of posture of vehicle, and using the servo control system to accurately drive the motor to adjust correspondingly to maintain the balance of the system.

MAN-MACHINE INTERACTION SOMATOSENSORY VEHICLE

CROSS-REFERENCE TO RELATED APPLICATION

This application is a 371 of international application of PCT application serial no. PCT/CN2017/092610, filed on Jul. 12, 2017, which claims the priority benefits of China Applications No. 201710005993.5, No. 201710006181.2, No. 201710005991.6 and No. 201710006953.2 filed on Jan. 4, 2017. The entirety of each of the above-mentioned patent applications is hereby incorporated by reference herein and made a part of this specification.

BACKGROUND

Technical Field

The present disclosure relates to a balancing vehicle, and particularly to a man-machine interaction somatosensory vehicle.

Description of Related Art

Man-machine interaction somatosensory vehicle, also known as electric balancing vehicle, thinking vehicle, its operating principle is mainly based on a basic principle called "dynamic stability", using the gyroscope and acceleration sensor inside the vehicle body to detect the change of posture of vehicle, and using the servo control system to accurately drive the motor to adjust correspondingly to maintain the balance of the system.

The existing man-machine interaction somatosensory vehicle is generally divided into two types: with an operating lever and without an operating lever. For the man-machine interaction somatosensory vehicle with operating lever, the man-machine interaction somatosensory vehicle is specifically operated and controlled by the operating lever. For the man-machine interaction somatosensory vehicle without the operating lever, the man-machine interaction somatosensory vehicle is controlled to move forward or backward by tilting the whole man-machine interaction somatosensory vehicle, and the steering is implemented by the user by means of placing feet on the pedal platform through a relative rotation angle difference between the two pedal platforms. Specifically, the two-wheeled self-balancing man-machine interaction somatosensory vehicle disclosed by Chinese Application No. CN201410262108.8 is the representative of the two-wheeled man-machine interaction somatosensory vehicle without the operating lever. An inner cover of the balancing vehicle comprises a symmetrically arranged left inner cover and a right inner cover, and the left inner cover is rotatably connected to the right inner cover.

However, the inner cover of the balancing vehicle for supporting the frame needs to comprise a left inner cover and a right inner cover, and the structure is relatively complicated.

SUMMARY

The disclosure is a man-machine interaction somatosensory vehicle with a simple structure proposed to overcome the prior art.

In order to achieve the above purpose, the present disclosure provides a man-machine interaction somatosensory vehicle. The man-machine interaction somatosensory vehicle comprises a vehicle body and two wheels disposed on the vehicle body, the wheels are able to rotate around the vehicle body in a radial direction; the vehicle body further comprises a supporting frame, two pedal devices provided on the supporting frame, a control device, and a driving device for driving the wheels; the supporting frame is of an integral structure and is rotatably connected to the wheels; the pedal devices comprise a pedal foot board and a first position sensor located between the pedal foot board and the supporting frame and configured for sensing the stress information on the pedal devices; and the control device controls, according to the stress information on the two pedal devices, the driving device to drive the wheels to move or steer.

Further, each of the first position sensors comprises two sensing element regions distributed at two portions on the pedal foot board, and the first position sensor senses the stress information of the two portions of the pedal foot board through the two sensing element regions, thereby obtaining the stress information of the pedal devices.

Further, the sensing element region is provided with a first force receiving portion and a second force receiving portion, and the first force receiving portion of each sensing element regions abuts against one of the supporting frame and the pedal foot board. The second force receiving portion abuts against the other of the supporting frame and the pedal foot board.

Further, a bottom surface of the element of one of the first force receiving portion and the second force receiving portion abutting against the pedal foot board is in suspended arrangement.

Further, the pedal device further comprises a sensor fixing base mounted on the supporting frame, and one of the first force receiving portion and the second force receiving portion that abuts against the supporting frame abuts against the supporting frame through the sensor fixing base.

Further, the first force receiving portion abuts against the pedal foot board, the second force receiving portion abuts against the sensor fixing base, and a bottom surface of the first force receiving portion is suspended.

Further, the first force receiving portion is provided with a first through hole, the second force receiving portion is provided with a second through hole, and the pedal foot board is provided with a first fixing hole, and the sensor fixing base is provided with a second fixing hole. The first force receiving portion is mounted on the pedal foot board and abuts against the pedal foot board in a manner that a first fixing member passes through the first through hole and is locked into the first fixing hole. The second force receiving portion is mounted on the sensor fixing base and abuts against the sensor fixing base in a manner that a second fixing member passes through the second through hole and is locked into the second fixing hole.

Further, the first fixing member comprises a screw, a nut, and a connecting rod connecting the screw and the nut, the connecting rod is a rod with a smooth side, and the connecting rod is located in the first through hole.

Further, the diameter of the connecting rod is smaller than the inner diameter of the first through hole.

Further, a gasket assembly is interposed between the nut and an outside force receiving portion.

Further, the pedal device further comprises a lower shell located between the sensor fixing base and the vehicle body.

Further, a foot pad is disposed above the pedal foot board, and the foot pad is connected to the lower shell in a closed manner.

Further, a bottom of the pedal device is recessed from bottom to top to partially receive the supporting frame.

Further, the first position sensor is a stress sensor.

Further, the first position sensor is configured to sense whether there is a user on the pedal device to control the wheels to start or stop.

Further, the man-machine interaction somatosensory vehicle further comprises a second position sensor for sensing tilt information of the supporting frame relative to the wheels.

Further, the second position sensor comprises a gyroscope, an acceleration sensor and/or a photoelectric sensor.

Further, the supporting frame is provided with a longitudinal power supply extending in an axial direction of the wheels, the power supply comprises a battery case, and the battery case and the supporting frame are made of metal.

Further, a position-limiting recess and a position-limiting protrusion matched with each other are disposed between the battery case and the supporting frame.

Further, the supporting frame is provided with a recessed guide rail, and the guide rail is provided with a pedal fixing bracket for mounting and holding the pedal device.

Further, the guide rail extends in a left-right direction and is disposed on a front side and/or a rear side of the supporting frame.

Further, the left and right ends of the guide rail are provided with a pedal device fixing bracket for respectively mounting and holding the two pedal devices on left and right.

Further, a single-sided guide rail for inserting the two pedal device fixing brackets on left and right is integrally extended or independent of each other.

Further, the guide rail has a T-shaped cross section.

Further, the pedal device fixing bracket comprises an insertion portion laterally inserted into the guide rail and a mounting portion extending outwardly from the guide rail for mounting and holding the pedal device.

Further, the mounting portion is provided with a fastening hole for fastening the pedal device.

Further, a supporting wing portion extending between the mounting portion and the insertion portion and attached to the supporting frame in an upward and/or a downward direction is provided.

Further, the supporting frame is a circular tube extending axially along the wheels, and the guide rail and the pedal device fixing bracket are located in an upper half portion of the supporting frame.

Further, a wheel axle is disposed between the wheel and the vehicle body, the wheel is rotatably connected to the vehicle body through the wheel axle, and a center of gravity of the vehicle body is lower than the wheel axle.

Further, one end of the wheel axle is connected to the wheel, and the other end is connected with a wheel axle fixing board, and the wheel axle fixing board is fixed to the vehicle body.

Further, the wheel axle is fixed to an upper half portion of the wheel axle fixing board.

Further, a lateral end of the supporting frame is provided with a motor fixing base for fixedly engaging the wheel axle fixing board, and a center of gravity of the motor fixing base is lower than the wheel axle.

Further, a sealing gasket is disposed between the wheel axle fixing board and the motor fixing base.

Further, the supporting frame is provided with a receiving cavity for inserting and engaging the motor fixing base, and the motor fixing base comprises an insertion end for inserting and positioning in the receiving cavity and a cover part connected to the insertion end for sealing an outer side of the receiving cavity.

Further, a power supply is disposed in the receiving cavity, and the motor fixing base is provided with a positioning rod laterally protruded for abutting against the power supply in the receiving cavity.

Further, a wheel cover is disposed above the wheel, and the cover part of the motor fixing base extends upward to form an insertion mounting leg for inserting and fixing the wheel cover.

Further, a position-limiting protrusion and a position-limiting recess extending left and right and matching each other are provided between a receiving cavity of the vehicle body and the insertion end of the motor fixing base.

Further, the wheel axle fixing board is perpendicular to the wheel axle direction.

Further, the driving device is disposed in the wheel, and the wheel axle is provided with a cable connecting the driving device, and the cable extends out of the wheel axle fixing board to be connected to the control device and/or the power supply.

Further, the motor fixing base is provided with a recessed receiving slot for receiving and holding the wheel axle fixing board.

Further, the control device comprises a main control board disposed laterally within the tubular supporting frame.

Further, a power supply is disposed in the supporting frame, and the main control board is provided with a battery docking interface for electrically connecting to the power supply.

Further, the power supply is provided with a battery interface for docking the battery docking interface.

Further, the battery docking interface is located in a middle portion of the main control board in a left-right direction.

Further, left and right ends of the main control board are provided with an external docking interface for electrically connecting to the driving devices and/or the first position sensors on two sides.

Further, a connector electrically connected to the driving device and electrically connected to the external docking interface is disposed between the supporting frame and the wheels.

Further, the external docking interface is located at both ends of the power supply in the left-right direction.

Further, the main control board is laterally disposed at a top end of the supporting frame, and the power supply is located below the main control board.

Further, front and rear sides above the power supply are provided with abutting ribs extending in left and right for abutting upward against the main control board, and an empty slot is provided between the abutting ribs and is disposed between the main control board and the power supply.

Further, the man-machine interaction somatosensory vehicle is provided with a transmission connection element, and the connection element comprises a power connection element, a Hall connection element, and a temperature connection element for transmitting a temperature signal.

Further, the transmission element is a cable or a connecting terminal.

Further, the transmission element comprises a Hall transmission element.

Further, the transmission element comprises one or more temperature transmission element.

Further, the transmission element comprises a power transmission element.

Further, a power supply is disposed in the supporting frame, and a temperature sensor for monitoring an internal temperature of the power supply is disposed inside the power supply, and the temperature transmission element is connected to the temperature sensor.

Further, a wheel axle is disposed between the wheel and the vehicle body, and the wheel is rotatably connected to the vehicle body through the wheel axle, and the driving device is disposed in the wheels, and the wheel axle is provided with a cable connected to the driving device, and the cable extends out of the wheel axle for connecting to a connector.

Further, the connector comprises a frame port and a connecting terminal correspondingly connected to the cable in the frame port.

Further, the power supply is connected to an external docking interface, and the external docking interface and the connector are docked with each other.

Further, the control device comprises a main control board, and a battery docking interface and a battery interface inserted into each other are interposed between the power supply and the main control board, the external docking interface is disposed on the main control board, and the external docking interface is connected to the power supply through the main control board.

Further, a wheel cover is disposed outside the wheel, and the wheel cover is provided with anti-collision adhesive.

Further, the anti-collision adhesive is protruded from an outer side of the wheel cover.

Further, the anti-collision adhesive is located on the front and rear sides of the wheel cover.

Further, the wheel cover is fixed on the vehicle body.

Further, the vehicle body comprises a motor fixing base disposed between the wheels and the supporting frame.

Further, the motor fixing base extends upward to form an insertion mounting leg for inserting and fixing the wheel cover, and a mounting insertion slot recessed from bottom to top for receiving the insertion mounting leg is provided below the wheel cover.

Further, a fixing rod protruding from top to bottom and located on front and rear sides of the mounting insertion slot is provided below the wheel cover, and the motor fixing base is provided with a fixing slot recessed from top to bottom and located on the front and rear sides of the insertion mounting leg for inserting, receiving and fixing the fixing rod.

Further, the wheel cover is provided with a wheel cover portion for shielding the wheel and an extension portion extending in a shrinking manner from the wheel cover portion to the supporting frame in a streamlined shape.

Further, the extending tail end of the extension portion is provided with a mounting notch for engaging the supporting frame.

Further, the first position sensor comprises two front and rear end portions and a connecting portion connecting the two end portions, each of the end portions comprises the first force receiving portion, the second force receiving portion, and the sensing element region between the first force receiving portion and the second force receiving portion.

Further, a first gap is formed between the pedal foot board and the sensing element region.

Further, a second gap is formed between the sensor fixing base and the sensing element region.

Due to the application of the above technical solutions, the present disclosure has the following advantages:

The man-machine interaction somatosensory vehicle of the present disclosure controls, according to the stress information on the pedal devices, the driving device to drive the wheels to move or steer, so as to effectively solve the problem in the available self-balancing vehicle of a complex structure caused by the necessity of designing the supporting frame as two rotatable portions and controlling the rotation of the wheels by means of the rotation of the two portions.

DESCRIPTION OF THE EMBODIMENTS

Figure 1:
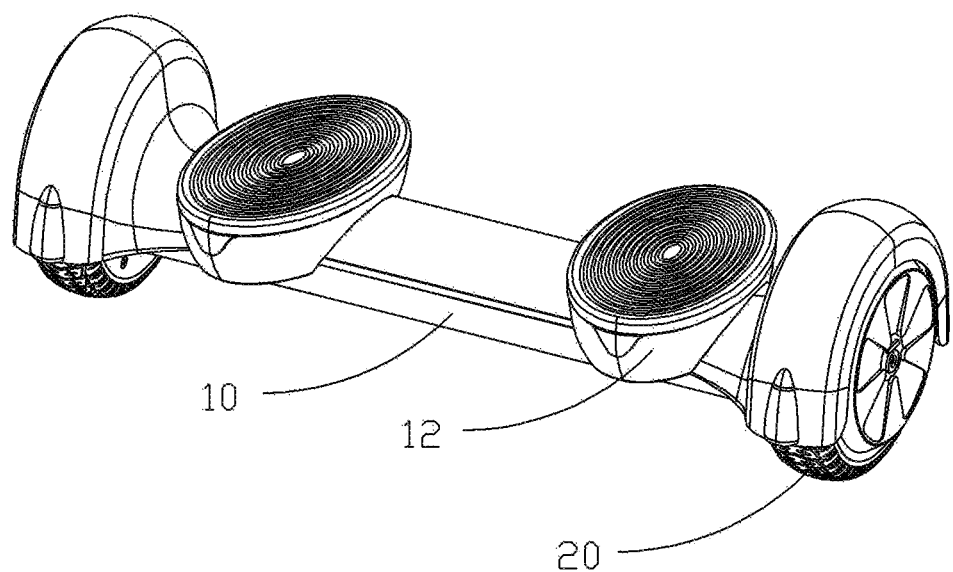
FIG. 1 is a three-dimensional assembled diagram of a man-machine interaction somatosensory vehicle of the present disclosure.
Figure 2:
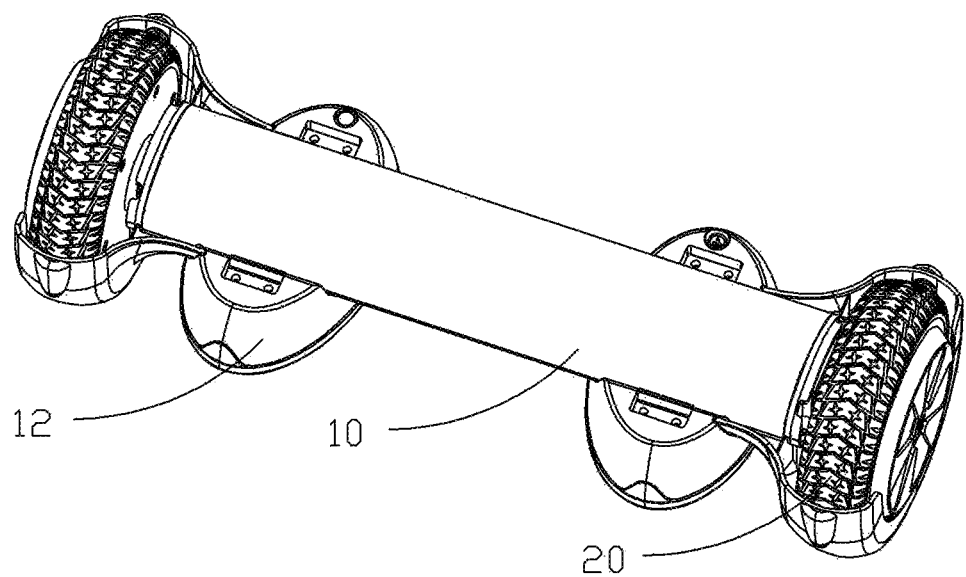
FIG. 2 is a three-dimensional assembled diagram showing the man-machine interaction somatosensory vehicle of the present disclosure from another angle.

In order to make the objects, technical solutions and advantages of the present disclosure more comprehensible, the present disclosure will be further described in detail below with reference to the accompanying drawings and embodiments. It should be understood that the specific embodiments described herein are merely illustrative of the disclosure and are not intended to limit the disclosure.

Referring to FIG. 1 to FIG. 17, which illustrate schematic structural diagram of a man-machine interaction somatosensory vehicle 100 of the present disclosure, it comprises a vehicle body 10 and two wheels 20 disposed on the vehicle body 10. The wheels 20 are rotatable around the vehicle body 10 in a radial direction. The vehicle body 10 further comprises a supporting frame 11, two pedal devices 12 disposed on the supporting frame 11, a control device 15, and a driving device (not shown) for driving the wheels 20. The supporting frame 11 is an integral structure and rotatably connected to the wheels 20. Each of the pedal devices 12 comprises a first position sensor 13 for sensing the stress information of the pedal device 12. The control device 15 controls the driving device to drive the wheel 20 to move or steer according to the stress information of the two pedal devices 12. It should be noted that the movement of the wheels 20 means that the driving device drives to output the same output to the two wheels 20, so that the wheels 20 has a same rotational speed to drive the vehicle body to move forward or backward (certainly, in extreme cases, it may also be stationary, in that case, the wheels 20 are in a balanced state). The steering of the wheels 20 means that the driving device outputs two different driving forces to the wheels 20, so that the rotational speeds of the wheels 20 are different, so that the vehicle body is steered when moving forward or steered when moving backward.

The supporting frame 11 is provided with a recessed guide rail 112. The guide rail 112 is inserted with a pedal device fixing bracket 18 for mounting and holding the pedal device 12. With such configuration, the structure is simple and easy to assemble, and the supporting frame 11 can be assembled with the pedal device fixing bracket 18 after being separately manufactured, so that different manufacturing processes can be selected according to the specific requirements of the two. For example, in some specific embodiments, the supporting frame 11 has a tubular shape, and the separated manufacturing facilitates the molding of the supporting frame 11. The integral structure refers to a structure in which the supporting frame 11 is an integral structure as compared with the left inner cover and the right inner cover which are rotatable with respect to each other in the prior art. In different embodiments, the integral structure may be separately assembled or integrally formed. Further, viewed from the cross-sectional diagram, the tubular shape may comprise a tubular shape, a polygonal tubular shape, or a tubular shape of any other cross-sectional shape. Viewed from extending in a left-right direction, the tubular shape not limited to a tubular tube extending in an equidistant manner can be a variety of irregularly extending tubular, such as partial enlargement, partial reduction, rotation, displacement, etc.

The guide rail 112 extends in the left-right direction and is disposed on a front side and/or a rear side of the supporting frame 11. In this context, the left-right direction is an axial direction of the wheels 20. In such configuration, the pedal device fixing bracket 18 can be inserted into the supporting frame 11 in the left-right direction, so that the pedal device fixing bracket 18 can receive a good fastening force in an up-down direction, which is favorable for supporting the pedal device 12 upwardly.

The left and right ends of the guide rail 112 are inserted with a pedal device fixing bracket 18 for mounting and holding the two pedal devices 12 on left and right, respectively. With such configuration, the two left and right pedal devices 12 are fixed on the pedal device fixing bracket 18. In the embodiment, the single-sided guide rail 112 for inserting the two pedal device fixing brackets 18 on left and right is integrally extended. The single side, that is, the front side or the rear side, for example, the same guide rail 112 on the front side can be simultaneously inserted with the pedal device fixing brackets 18 for respectively holding the two pedal devices 12 without interruption. In this manner, the structure is simple and easy to manufacture and assemble. In other embodiments, the single-sided guide rails 112 can also be set independently of each other.

The guide rail 112 has a T-shaped cross section. With such configuration, the pedal device fixing bracket 18 can be inserted into the guide rail 112 to prevent detaching outward. Certainly, in other embodiments, the cross section of the guide rail 112 can be set in other shapes, such as a triangle, a circle, etc. as long as a diameter of the opening of the guide rail is smaller than an inner diameter of the guide rail so that the pedal device fixing bracket 18 is not easy to fall off.

The pedal device fixing bracket 18 comprises an insertion portion 181 for laterally inserting into the guide rail 112, and a mounting portion 183 extending outwardly from the guide rail 112 for mounting and holding the pedal device 12. In this way, the pedal device fixing bracket 18 can be fixed on the supporting frame 11 for holding the pedal device 12.

The mounting portion 183 is provided with a fastening hole 101 for fastening the pedal device 12. In this way, the fastening hole 101 can be provided with a fastening member such as a nut to achieve a stable connection with the pedal device 12.

A supporting wing portion 182 extending between the mounting portion 183 and the insertion portion 181 and attached to the supporting frame 11 in an upward and/or a downward direction is provided. In this way, the supporting wing portion 182 can be abutted on the supporting frame 11 in the up-down direction, thereby improving the robustness of the pedal device fixing bracket 18, thereby improving the fastening stability between the pedal device 12 and the supporting frame 11.

In the present embodiment, the supporting frame 11 is a tubular shape extending axially along the wheel 20, and the guide rail 112 and the pedal device fixing bracket 18 are both located in an upper half portion of the supporting frame 11. In this manner, the supporting frame 11 can provide better upward support to the pedal device fixing bracket 18. Certainly, the guide rail 112 and the pedal device fixing bracket 18 are disposed on the upper half portion of the supporting frame 11 as a preferred implementation, but the arrangement should not be construed as a limitation to the present disclosure. In other embodiments, the guide rail 112 and the pedal device fixing bracket 18 may also be located in a middle or lower portion of the supporting frame 11.

The insertion portion 181 has a T-shaped cross section. In this way, the insertion portion 181 can be closely engaged with the guide rail 112 to improve the fastening stability. In other embodiments, the cross section of the insertion portion 118 corresponding to the guide rail 112 may be set to a circle, a triangle, or the like.

The man-machine interaction somatosensory vehicle 100 further comprises a power supply 16 for supplying power to the driving device, the first position sensor 13 and the control device 15, and the control device 15 is configured to control the power source 16, the driving device and the first position sensor 13, and sends a driving signal to the driving device according to the stress information sensed by the first position sensor 13, thereby driving the wheels 20 to rotate.

A wheel axle 21 is disposed between the wheel 20 and the vehicle body 10, and the wheel 20 is rotatably connected to the vehicle body 10 through the wheel axle 21.

Preferably, a center of gravity of the vehicle body 10 is lower than the wheel axle 21. In this manner, the vehicle body 10 as a whole can always hang the center of gravity below the wheel axle 21, and keep the vehicle body 10 to maintain in the original state without turning up when the man-machine interaction somatosensory vehicle 100 is in an operating or non-operating state. Even if the vehicle body 10 is turned up by an external force, the vehicle body 10 can be restored to the original position due to the effect of gravity, thereby bringing great convenience to the user when in use. In other embodiments, the center of gravity of the vehicle body 10 may also be set not lower than the wheel axle 21, and the setting of the center of gravity of the vehicle body should not be construed as a limitation to the present disclosure.

It can be understood that the wheel 20 is rotatably connected to the vehicle body 10 through the wheel axle 21 in a plurality of ways. For example, in a specific embodiment, the wheel 20 can be fixed on the wheel axle 21, and the wheel axle 21 is rotatably connected to the vehicle body 10. Alternatively, in other embodiments, the wheel axle 21 may be fixed on the vehicle body 10, and the wheel 20 is rotated along the wheel axle 21.

In the present embodiment, one end of the wheel axle 21 is connected to the wheel 20, the other end thereof is connected to a wheel axle fixing board 23, and the wheel axle fixing board 23 is fixed on the vehicle body 10. As such, the wheel 20 can be assembled to the supporting frame 11 after being connected to the wheel axle fixing board 23, thereby facilitating modular assembly between the supporting frame 11 and the wheel 20.

The wheel axle 21 is fixed on an upper half portion of the wheel axle fixing board 23. In this manner, after the wheel axle fixing board 23 is mounted on the supporting frame 11, the center of gravity of the vehicle body 10 can be better positioned below the wheel axle 21.

The lateral side of the supporting frame 11 is provided with a motor fixing base 3 for fixedly engaging the wheel axle fixing board 23, and a center of gravity of the motor fixing base 3 is lower than the wheel axle 21 after being assembled with the wheel axle fixing board 23. With this arrangement, it is further ensured that the center of gravity of the vehicle body 10 is lower than the wheel axle 21. Specifically, the motor fixing base 3 can be made of a metal having a relatively large mass to ensure that the center of gravity of the vehicle body 10 is below the wheel axle 21 and maintains high stability.

A sealing gasket (not shown) is disposed between the wheel axle fixing board 23 and the motor fixing base 3. In this way, a better dustproof and waterproof effect between the vehicle body 10 and the wheel 20 can be achieved.

The supporting frame 11 is provided with a receiving cavity 110 for inserting and engaging the motor fixing base 3. The motor fixing base 3 comprises an insertion end 32 for inserting and positioning in the receiving cavity 110 and a cover part 31 connected to the insertion end 32 for sealing an outer side of the receiving cavity 110. In this manner, the motor fixing base 3 can be mounted and fixed to the supporting frame 11 through the insertion end 32, and the cover body is closed on an outer side of the supporting frame 11 to achieve better sealing effect.

The power supply 16 is disposed in the receiving cavity 110. The motor fixing base 3 is provided with a positioning rod 312 that is laterally protruding for abutting against the power supply 16 into the receiving cavity 110. In this way, the motor fixing base 3 can prevent the power supply 16 from shaking left and right, and improve the structural stability of the interior of the vehicle body 10.

A wheel cover 123 is disposed above the wheel 20, and the cover part 31 of the motor fixing base 3 extends upward to form an insertion mounting leg 311 for inserting and fixing the wheel cover 123. In this way, the wheel cover 123 can be stably fixed on the motor fixing base 3 for easy assembling. In other embodiments, the wheel cover 123 can also be fixed on the vehicle body 10 by other means.

A position-limiting protrusion 111 and a position-limiting recess 321 extending left and right and matching each other are disposed between the receiving cavity 110 of the vehicle body 10 and the insertion end 32 of the motor fixing base 3. In this way, on the one hand, it can be prevented that the motor fixing base 3 is rotated in the receiving cavity 110; and when the elements are assembled, it can be prevented that the two parts are reversely mounted, thereby achieving a fool-proof positioning function. Moreover, the position-limiting protrusion 111 can also serve as a reinforcing rib to increase the robustness of the supporting frame 11 and improve the structural stability of the vehicle body 10. In other embodiments, the position-limiting protrusion 111 can also be disposed on the insertion end 3, and the position-limiting recess 321 is disposed in the receiving cavity 110.

The wheel axle fixing board 23 is perpendicular to the linear direction of the wheel axle 21. In this way, the wheel axle fixing board 23 is less likely to be deflected when subjected to the effect of the vehicle body 10 in the front-rear direction and/or the up-down direction, and the fastening stability between the wheel axle fixing board 23 and the vehicle body 10 is improved. In other embodiments, the wheel axle fixing board 23 may not be perpendicular to the linear direction of the wheel axle 21.

The driving device is disposed in the wheel 20, and the wheel axle 21 is provided with a cable 211 connected to the driving device, and the cable 211 extends out of the wheel axle fixing board 23 for connecting with the control device 15 and/or the power supply 16. As such, the driving device in the wheel 20 can be connected to the control device 15 and/or the power supply 16 through the cable 211 passing through the wheel axle fixing board 23. The driving device is a motor. In other embodiments, the driving device may also be disposed in the vehicle body 20.

The motor fixing base 3 is provided with a recessed receiving slot 33 for receiving and holding the wheel axle fixing board 23. In this way, the wheel axle fixing board 23 can be received and positioned in the receiving slot 33, thereby improving the flatness of the outer surface of the vehicle body 10. In other embodiments, the motor fixing base 3 may also be integrally formed with a part or the whole of the supporting frame 11.

The wheel axle fixing board 23 is rectangular, and the receiving slot 33 is a rectangle corresponding to the wheel axle fixing board 23. In other embodiments, other shapes are also possible. In this way, the receiving slot 33 can be inserted in and position the wheel axle fixing board 23 to prevent the wheel axle fixing board 23 from moving or rotating.

The pedal device 12 further comprises a pedal foot board 121 above the first position sensor 13, the first position sensor 13 comprises two sensing element regions 1313, and the two sensing element regions 1313 are distributed in the front and rear portions of the pedal foot board 121. A second force receiving portion 1312 for directly or indirectly abutting against the supporting frame 11 is provided at an end where the two sensing element regions 1313 are close to each other. A first force receiving portion 1311 for directly or indirectly abutting against the pedal foot board 121 is provided at an end where the two sensing element regions 1313 are away from each other. Thus, when the pedal foot board 121 is pedaled downward, the first force receiving portions 1311 on front and rear sides receive an up-down force, and the second force receiving portion 1312 in the middle receives a bottom-up abutting force, such that the first position sensor 13 exhibits an arc deformation similar to an upward arc, which can be interpreted as a macroscopic deformation or a microscopic deformation, so that the sensing element regions 1313 at the front and rear ends sense the amount of deformation. A bottom surface of the first force receiving portion 1311 is in suspended arrangement, so that the first force receiving portion 1311 has a space for moving downward when the pedal foot board 121 is subjected to a pedaling force, which facilitates the sensing element region 1313 to be easily arched upward. Certainly, the upper portion of the second force receiving portion 1312 is preferably in suspended arrangement. Preferably, a first gap 5 is formed between the pedal foot board 121 and the sensing element region 1313, and the first gap 5 can provide a space for the sensing element region 1313 in the first position sensor 13 to be upwardly arched. Certainly, in other embodiments, the first force receiving portion 1311 can abut against the supporting frame 11, the second force receiving portion 1312 abuts against the pedal foot board 121, and a bottom surface of the second force receiving portion 1312 is in suspended arrangement. A top surface of the first force receiving portion 1311 is preferably in suspended arrangement. The deformation principle of the sensing element region 1313 in this embodiment is similar to the above-described deformation, and related details are not described herein. It should be noted that the distribution of the two sensing element regions 1313 under the same pedal foot board 121 is not limited to the front and rear regions of the pedal foot board 121, and the distribution may be in the left and right regions of the pedal foot board 121.

The direct abutment means that there is no other element between two parts and the two parts are in direct contact to achieve the abutment. The indirect abutment means that the two parts abut against each other through transmission of force of other elements. For example, in the embodiment, a sensor fixing base 125 is further disposed in the abutment between the second force receiving portion 1312 and the supporting frame 11.

Figure 4:
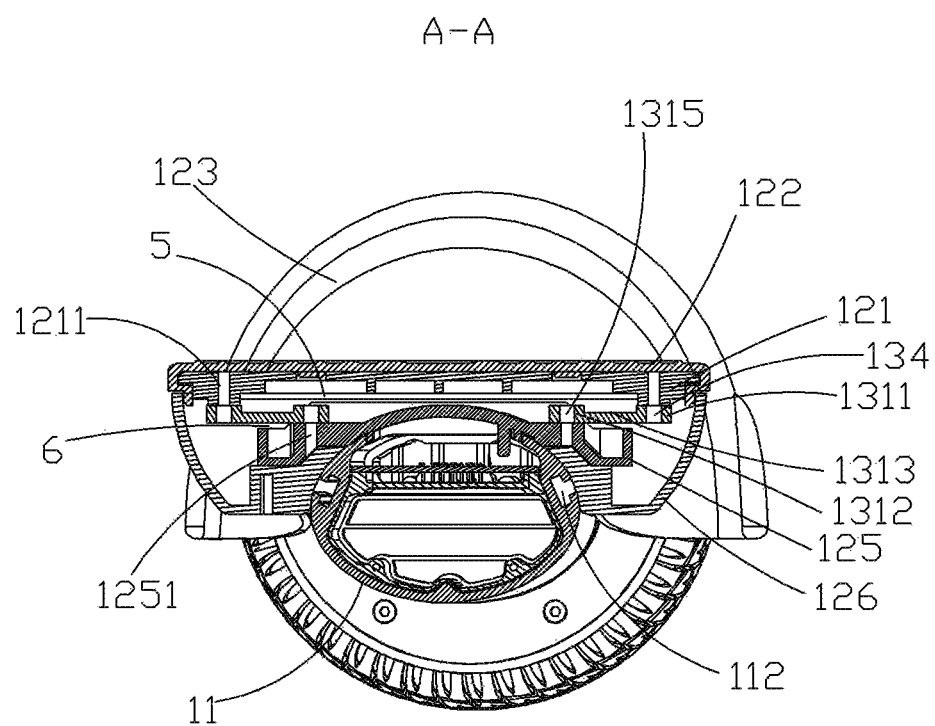
FIG. 4 is a cross-sectional view taken along line A-A of FIG. 3.
Figure 5:
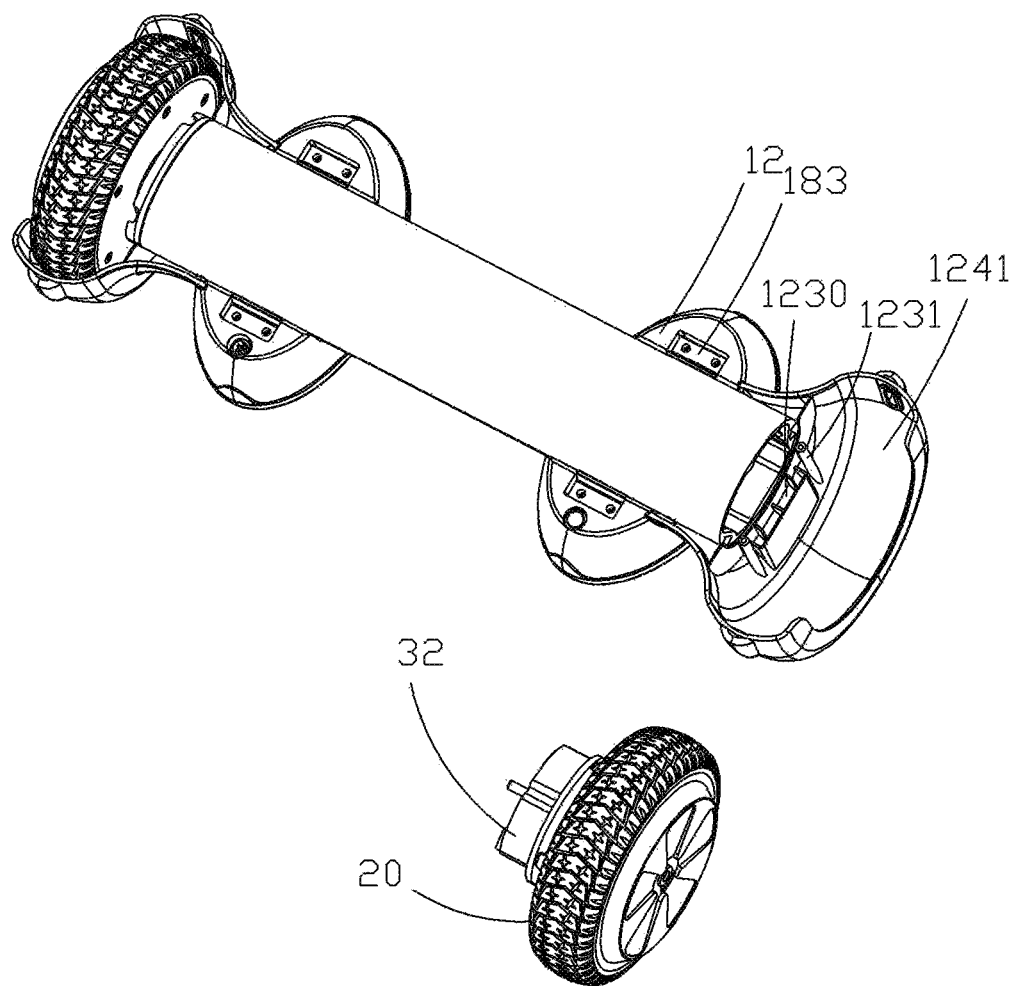
FIG. 5 is a partial exploded three-dimensional view of wheels of the man-machine interaction somatosensory vehicle of the present disclosure.
Figure 6:
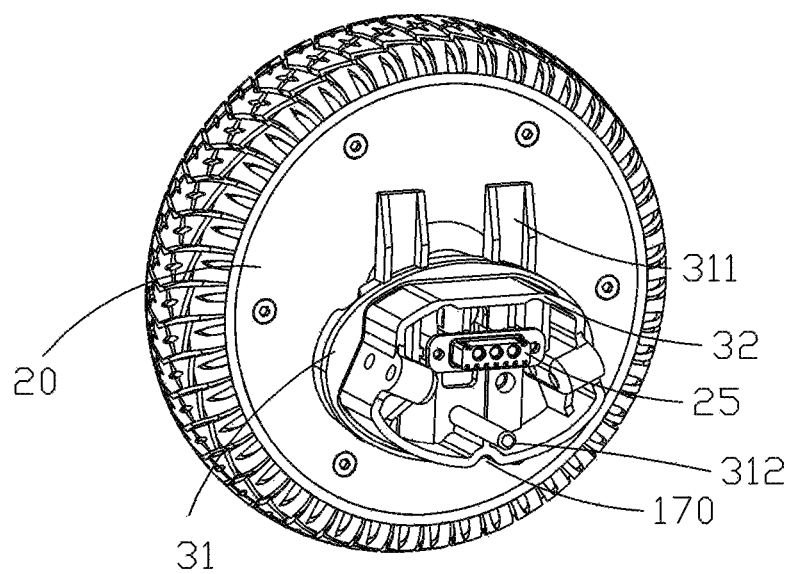
FIG. 6 is a three-dimensional assembled diagram of a relevant part of the wheels of FIG. 5.
Figure 7:
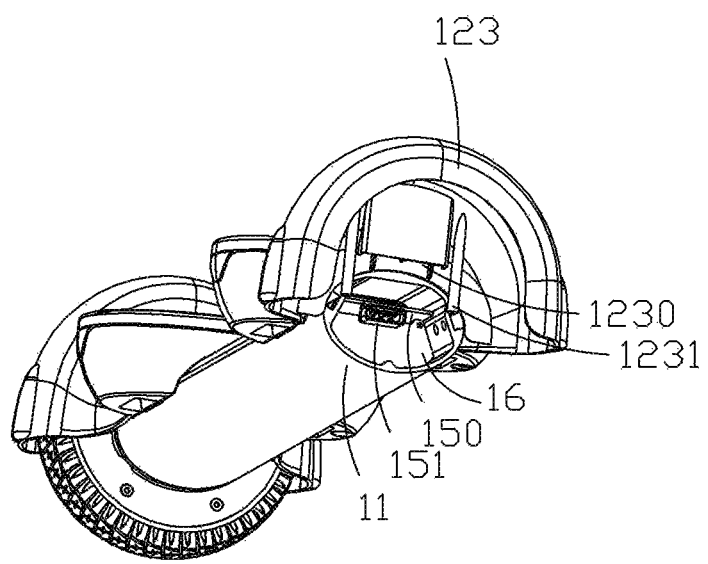
FIG. 7 is a three-dimensional assembled diagram of a relevant part of a vehicle body of FIG. 5.
Figure 8:
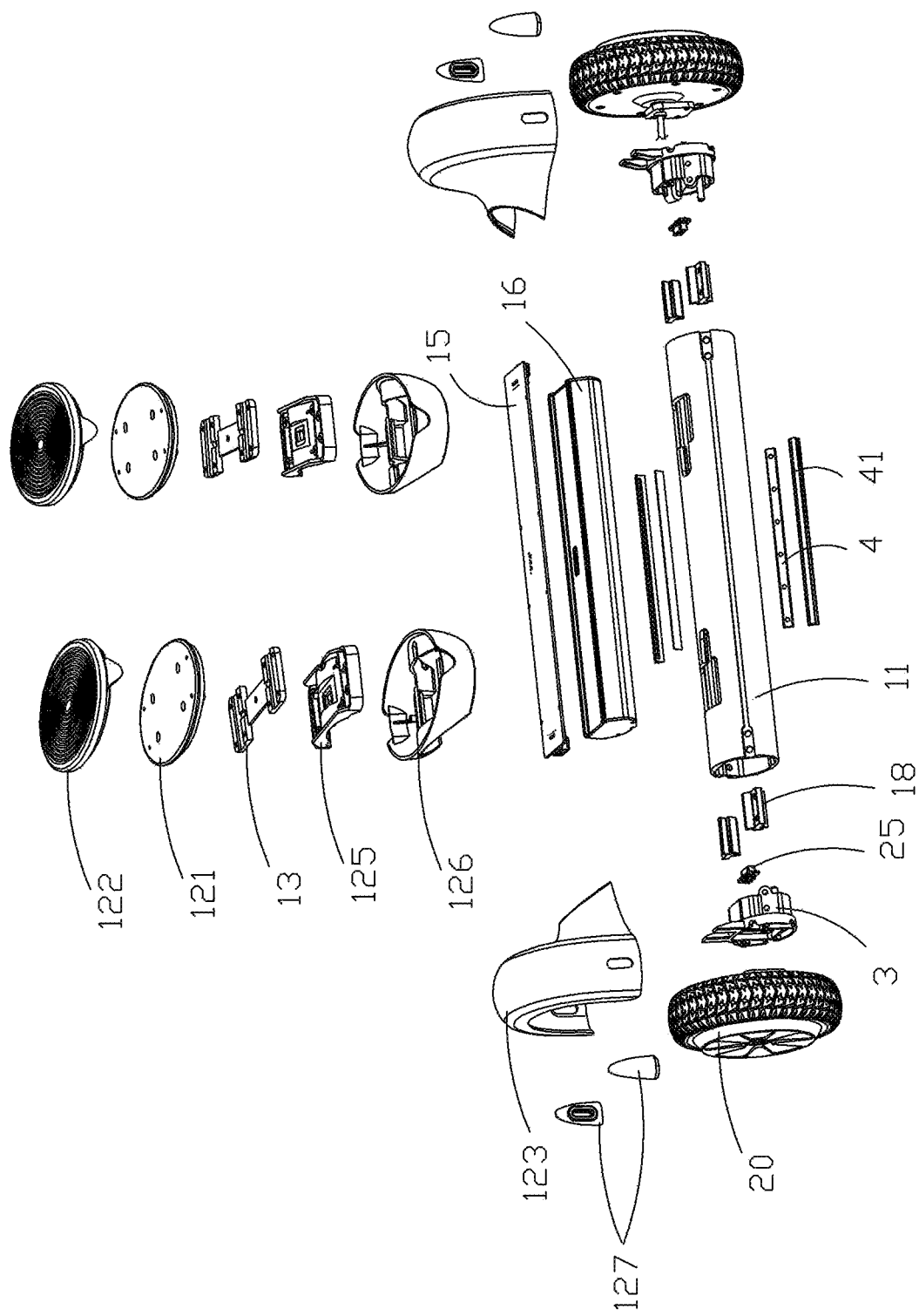
FIG. 8 is an exploded three-dimensional view of the man-machine interaction somatosensory vehicle of the present disclosure.
Figure 9:
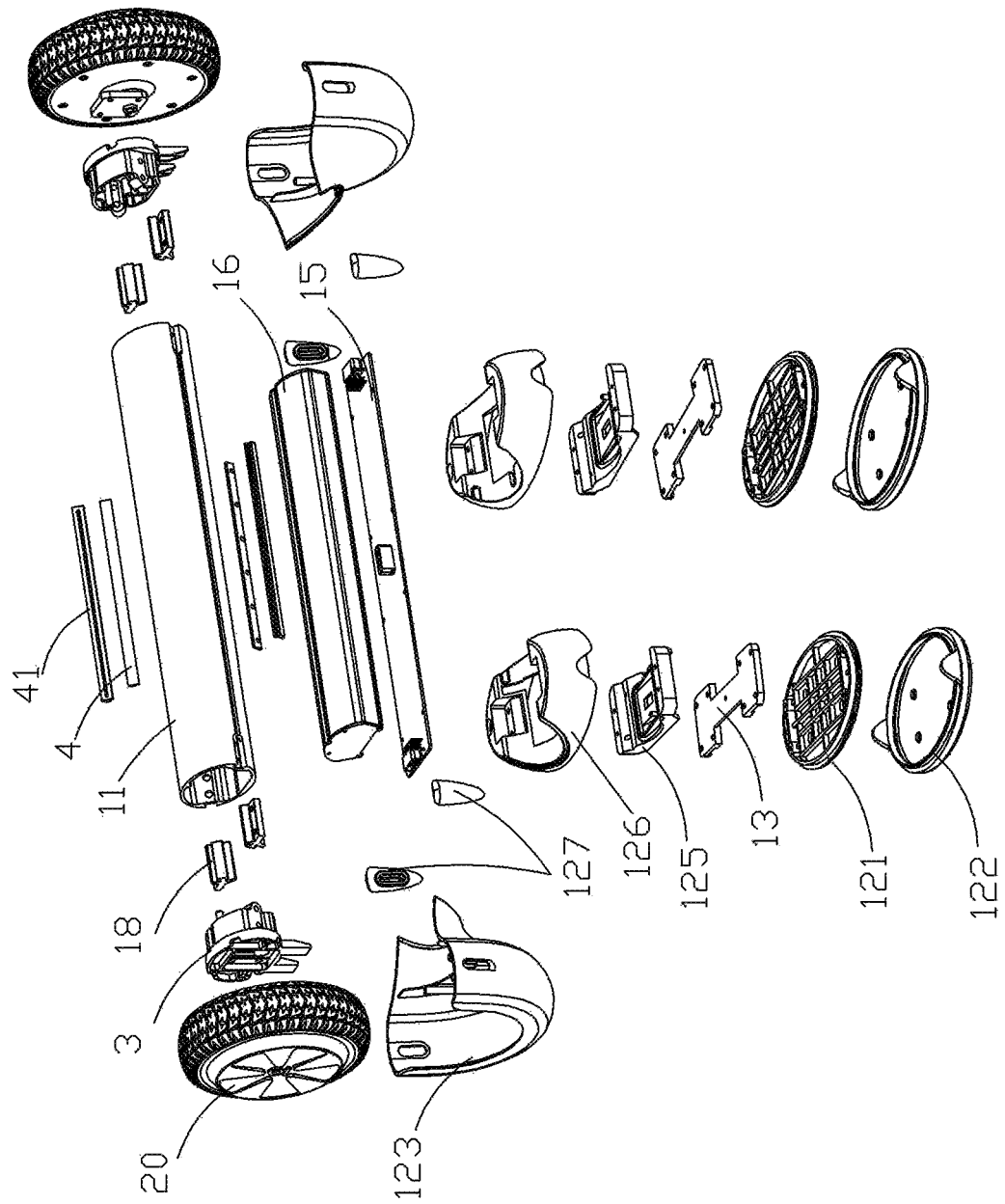
FIG. 9 is an exploded three-dimensional diagram showing the man-machine interaction somatosensory vehicle of the present disclosure from another angle.
Figure 10:
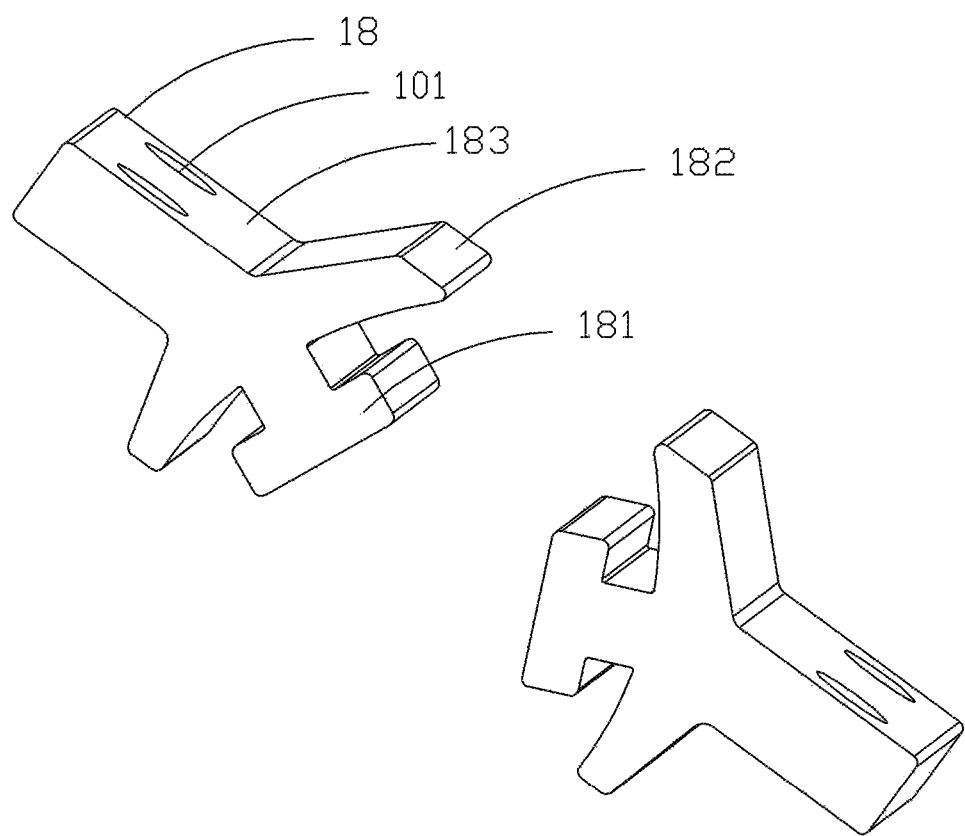
FIG. 10 is a three-dimensional structure diagram showing a pedal device fixing bracket of the man-machine interaction somatosensory vehicle of the present disclosure.
Figure 11:
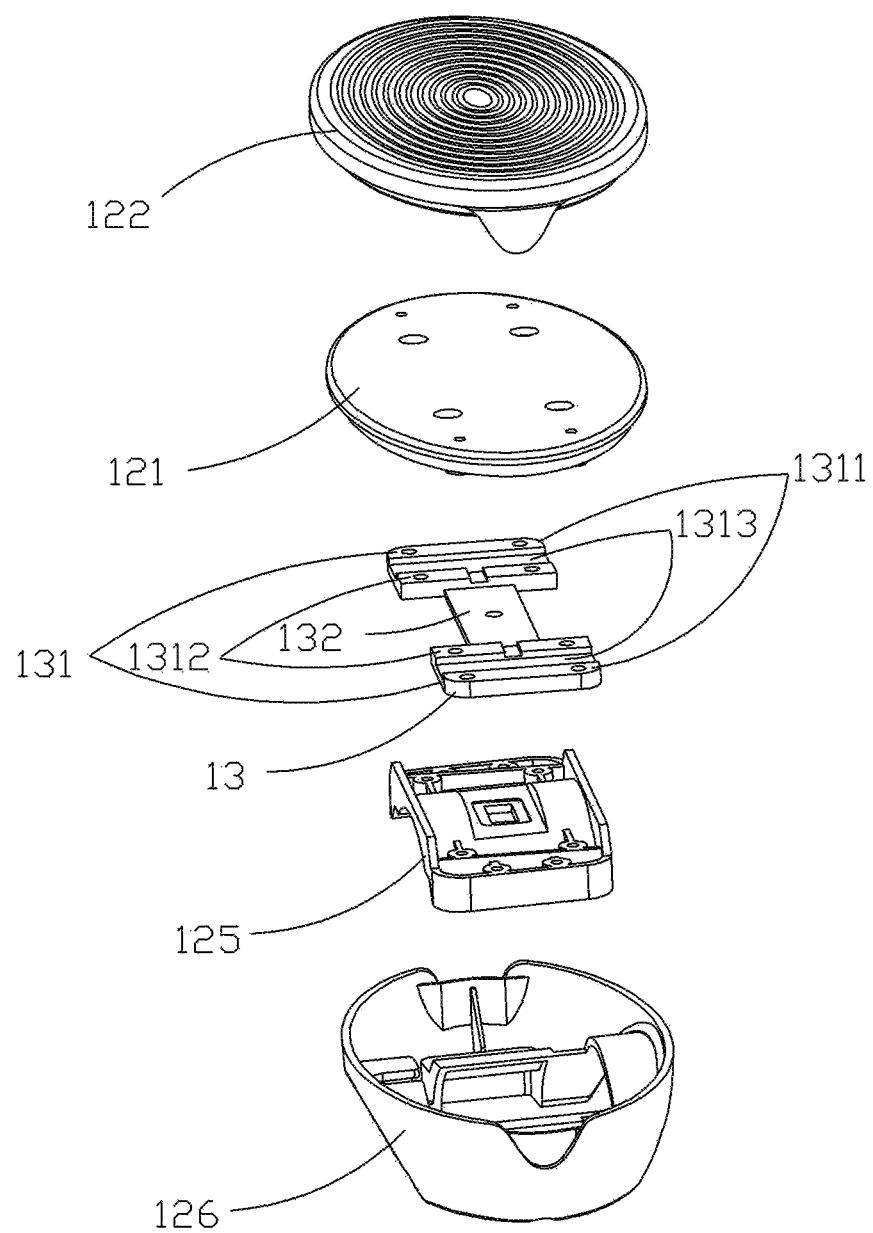
FIG. 11 is an exploded diagram of the structure of the pedal device of FIG. 8.
Figure 12:
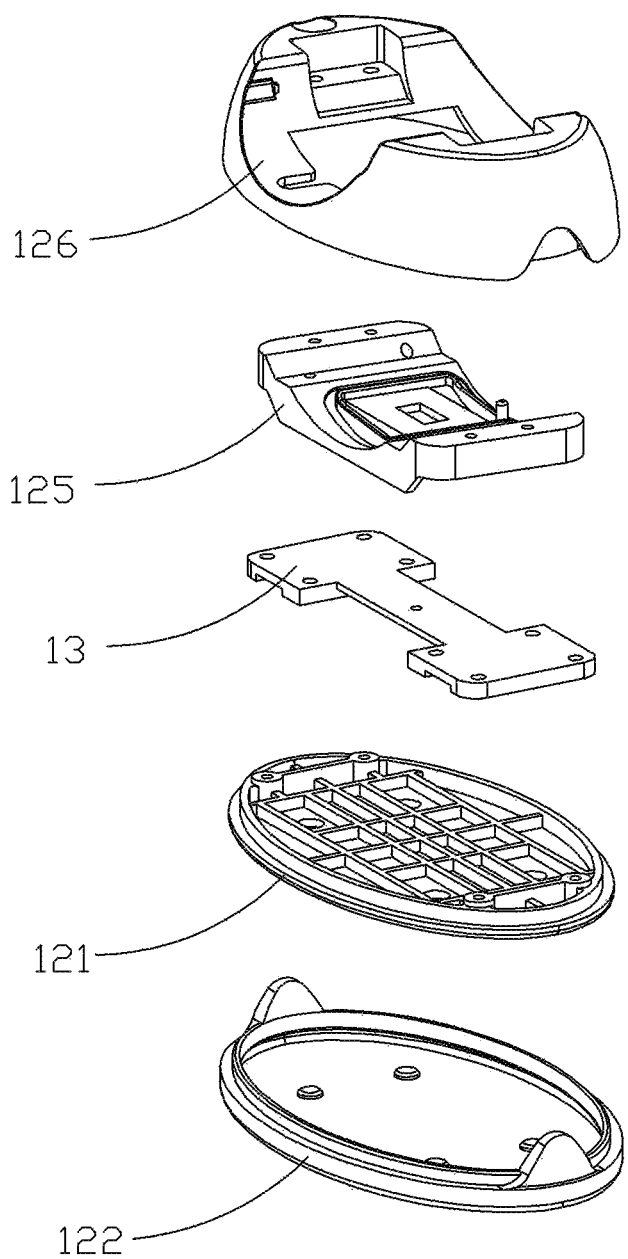
FIG. 12 is an exploded diagram showing the pedal device of FIG. 11 from another angle.
Figure 13:
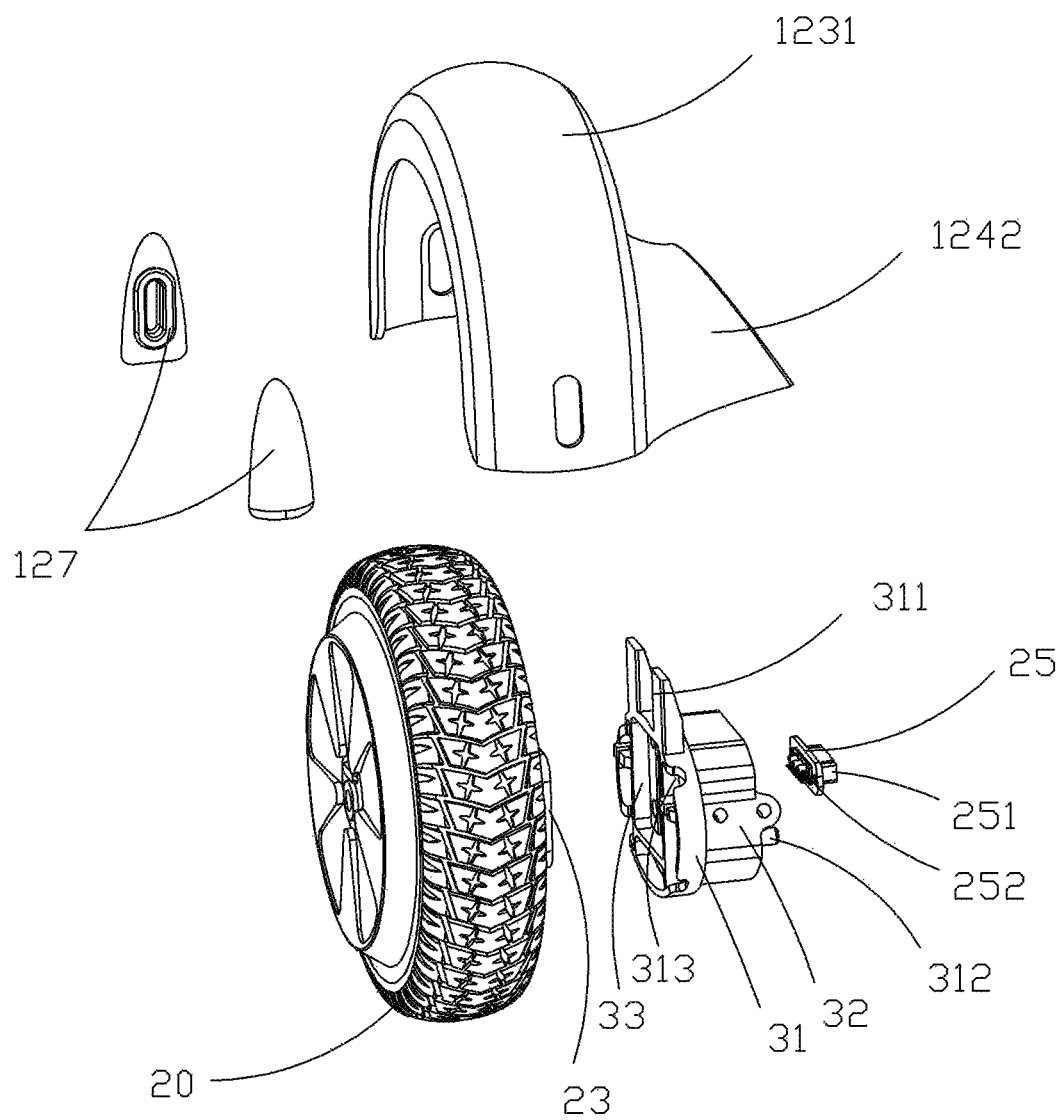
FIG. 13 is an exploded diagram showing the structure of the relevant part of the wheels of FIG. 8.
Figure 14:
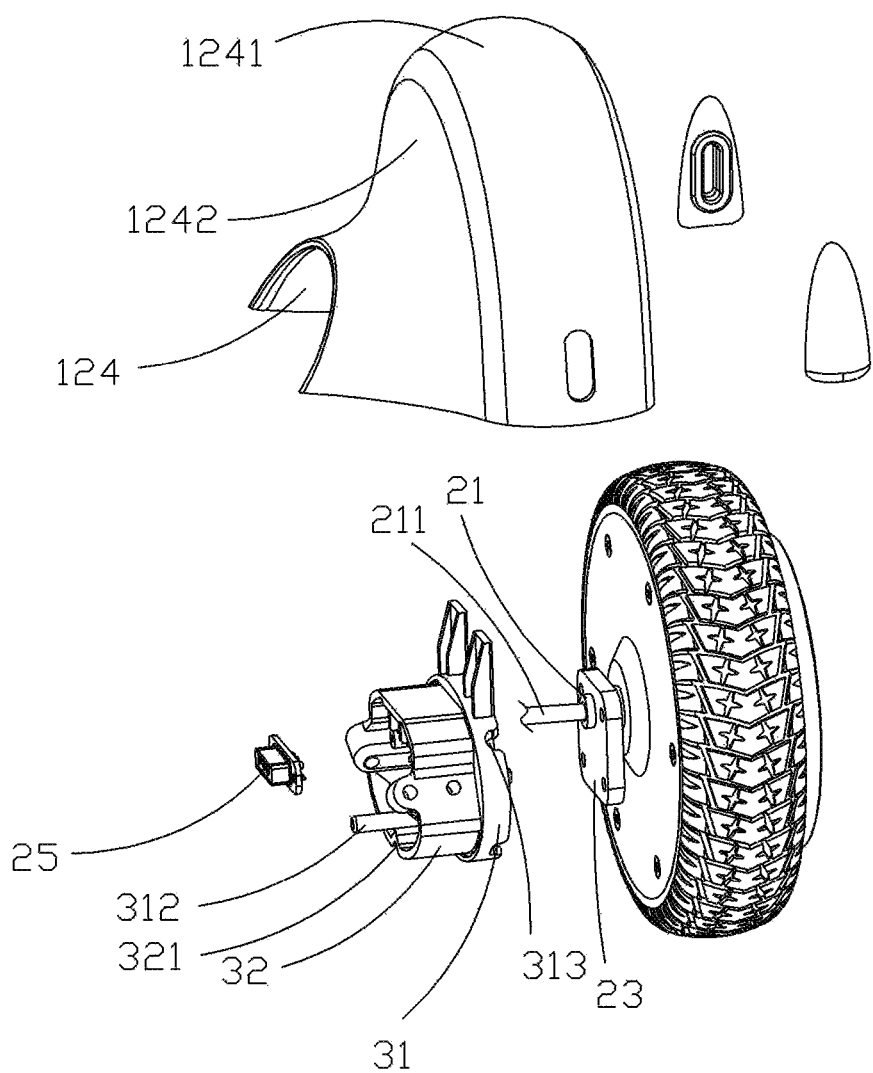
FIG. 14 is an exploded diagram showing the structure of the relevant part of the wheels of FIG. 13 from another angle.
Figure 15:
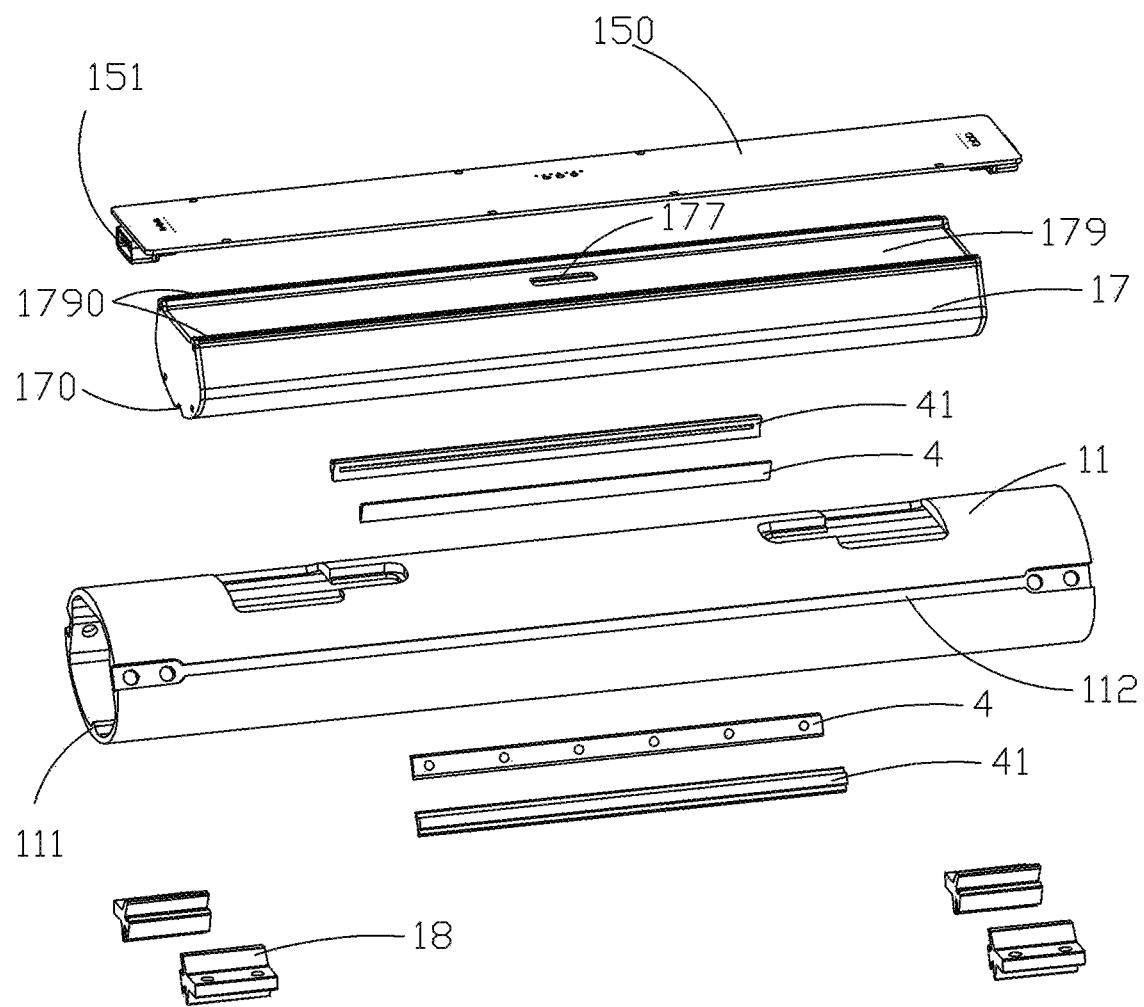
FIG. 15 is an exploded diagram showing the structure of the relevant part of the vehicle body of FIG. 8.
Figure 16:
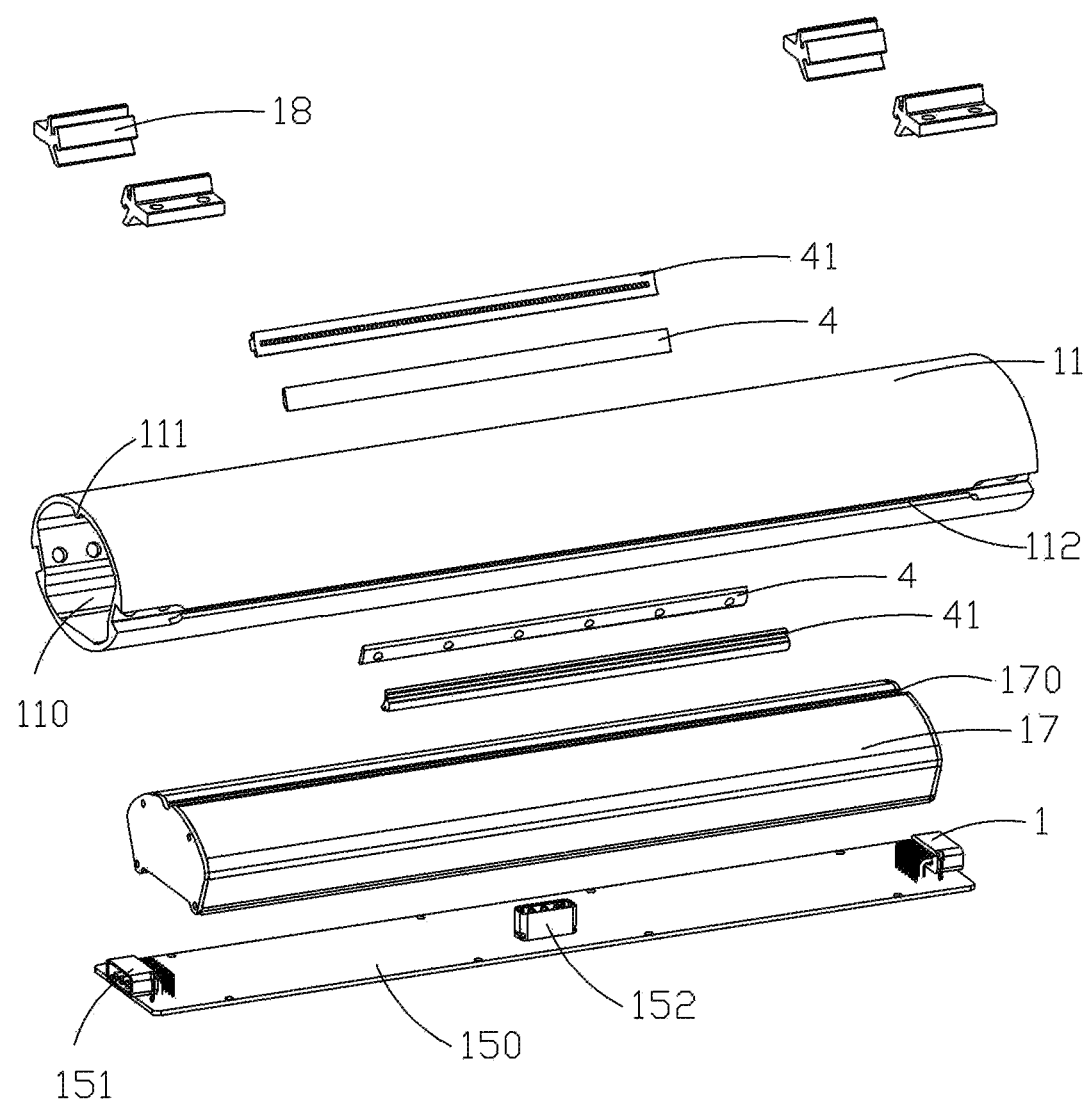
FIG. 16 is an exploded diagram showing the relevant part of the vehicle body of FIG. 15 from another angle.

Specifically, as shown in FIG. 4, the pedal device 12 comprises the sensor fixing base 125 for directly fixing on the second force receiving portion 1312, and the sensor fixing base 125 is configured for directly or indirection fixing on the supporting frame 11. In this way, the first position sensor 13 can be fixed on the sensor fixing base 125 and then mounted on the supporting frame 11 to protect the first position sensor 13 during installation. It should be noted that a second gap 6 is formed between the sensor fixing base 125 and the sensing element region 1313 in order to provide a space for the sensing element region 1313 to deform downward.

Figure 17:
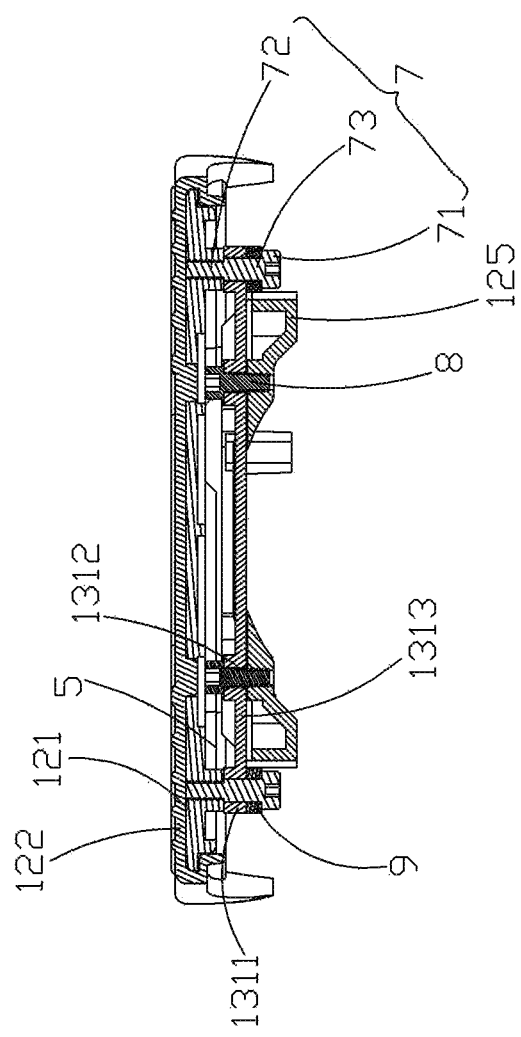
FIG. 17 is a cross-sectional diagram of the pedal device of FIG. 1 and shows a fixing member.

As shown in FIG. 4 and FIG. 17, in the embodiment, the first force receiving portion 1311 is provided with a first through hole 134, and the second force receiving portion 1312 is provided with a second through hole 1315. The pedal foot board 121 is provided with the first fixing hole 1211. The sensor fixing base 125 is provided with the second fixing hole 1251. The first force receiving portion 1311 is mounted on the pedal foot board 121 and abuts against the pedal foot board 121 in a manner that the first fixing member 7 passes through the first through hole 134 and is locked into the first fixing hole 1211. The second force receiving portion 1312 is mounted on the sensor fixing base 125 and abuts against the sensor fixing base 125 in a manner that the second fixing member 8 passes through the second through hole 1315 and is locked into the second fixing hole 1251.

In the present embodiment, the first fixing member 7 comprises a screw 71, a nut 72, and a connecting rod 73 connecting the screw 71 and the nut 72. The connecting rod 73 is a rod with a smooth side, and the connecting rod 73 is located in the first through hole 134. When the first fixing member 7 is in use, the connecting rod 73 and the first through hole 134 are in smooth contact, which can reduce the friction between the connecting rod 73 and the first through hole 134, and avoid damage to the first through hole 134 due to excessive friction, leading to the problem of deformation of the sensing element region 1313.

The diameter of the connecting rod 73 is slightly smaller than the inner diameter of the first through hole 134, so that the friction between the connecting rod 73 and the first through hole 134 can be further reduced without affecting the mounting effect of the first fixing member 7 mounting the first force receiving portion 1311 on the pedal foot board 121.

A gasket assembly 9 is interposed between the nut 72 and the first force receiving portion 1311. The gasket assembly 9 can prevent the first force receiving portion 1311 from being excessively stressed, leading to the problem of deformation of the sensing element region 1313 when the first fixing member 7 mounts the first force receiving portion 1311 on the pedal foot board 121.

It can be understood that the second fixing member 8 can be configured as the structure of the first fixing member 7 or a common bolt. A gasket assembly can also be disposed between the head portion of the second fixing member 8 and the second force receiving portion 1312.

The first position sensor 13 is, for example, a stress sensor that comprises two front and rear end portions 131 and a connecting portion 132 connecting the two end portions 131. Each of the end portions 131 comprises the second force receiving portion 1312, the first force receiving portion 1311 and the sensing element region 1313 located between the second force receiving portion 1312 and the first force receiving portion 1311. In this manner, the front and rear end portions 131 can sense different stress information according to different forces applied by the front and rear feet respectively. In another expression, it can be understood that the two different stress sensors respectively test different forces applied by the front and rear feet. The two sensing element regions 1313 are connected through the connecting portion 132, and when one end portion 131 is subjected to force, the other end portion 131 has a tendency to be tilted through the action of the connecting portion 132, so that the sensing element region 1313 in the end portion 131 having an upward tilting tendency is recessed downward, which may cause a negative stress to be generated, which is more advantageous for calculating the stress difference through the two sensing element regions 1313, so that the accuracy and sensitivity of the stress collected by the first position sensor 13 is improved, and it is convenient for the control device to control the output force of the driving device through the first position sensor 13.

In summary, that is, the same pedal device 12 is provided with the two sensing element regions 1313 for sensing the stress information of the same foot, and the stress applied to the two portions (specifically corresponding to the front portion and the rear portion of the pedal device 12) corresponding to the pedal device 12 and sensed by the two sensing element regions 1313 is the stress information from the same foot on the same pedal device 12. More specifically, the difference in the stress sensed by the two sensing element regions 1313 is the stress information of the same foot on the same pedal device 12. In other words, for the same first position sensor 13, that is, the control device 15 receives the stress value sensed by the two sensing element regions 1313 in the same first position sensor 13, and the control device 15 calculates the difference between the two stress values, each of the pedal devices 12 corresponds to one stress difference, and finally the control device 15 drives, according to the relationship between the two stress differences, i.e., the stress information, the wheel 20 to rotate, which in turn drives the vehicle body of the man-machine interaction somatosensory vehicle to move or steer.

Specifically, when the stress information of the two pedal devices 12 is the same (specifically referred to as stress difference, the stress difference herein does not refer to the absolute value of the stress difference, but has a direction, for example, for a pedal device 12, when the front portion is subjected force, the stress difference is recorded as positive, and when the stress on the rear portion is large, the stress difference is recorded as a negative value), the control device 15 controls the driving device to output the same driving force to the two wheels 20, so that the two wheels 20 rotate in a same speed, realizing movement of the vehicle body 10. As a special case, when the vehicle body is in the balanced state, the rotational speeds of the two wheels 20 are zero, and the vehicle body does not move on this occasion. When the stress information of the two pedal devices 12 is different, the control device 15 controls the driving device to output different driving forces to the two wheels 20, wherein one of the wheels 20 receives a driving force greater than that of the other one of the wheels 20, so that the rotational speeds of the two wheels 20 are different. As such, the moving speed of the wheel 20 on one side is greater than the moving speed of the other wheel 20 on the other side, thereby achieving steering. It should be noted that the first position sensor 13 can only control the rotation of the wheels 20 to drive the vehicle body to move or steer, but the rotational speeds of the wheels 20 in movement need to be controlled by other sensors. How the control device 15 controls the driving device to output the same driving force is described in details below.

Specifically, the man-machine interaction somatosensory vehicle 100 further comprises a second position sensor (not shown) for sensing the tilt information of the supporting frame 11 relative to the wheels 20. In this way, when the user stands on the pedal device 12, the stress information of the two pedal devices 12 is the same. When the user leans forward, the supporting frame 11 is driven to be tilted forward as a whole, and after the second position sensor senses the information that the supporting frame 11 is tilted forward, the second position sensor sends the information that the supporting frame 11 is tilted forward to the control device 15. Then the control device 15 controls and drives the wheel 20 to move forward so that the whole has a backward tilting force, which brings a balancing function. In addition, the greater the tilt angle sensed by the second position sensor, the greater the driving force. Specifically, the second position sensor comprises a gyroscope, an acceleration sensor, and/or a photoelectric sensor. It should be noted that when the user leans backward, the wheel 20 moves backward, and the principle thereof is the same as the principle of the forward motion described above, and related details are not described herein.

In this embodiment, the same pedal device 12 is provided with two sensing element regions 1313 for sensing the stress information on the same foot. In other embodiments, the first position sensor 13 may be a sensor having only one sensing element region 1313, that is, it may be expressed as that the same pedal device 12 may be provided with two first position sensors 13 of this kind for sensing the stress information on different parts of the same foot. The control device 15 is configured to drive the wheel 20 to move or steer according to the stress difference between the two first position sensors 13. In this way, when the two pedal devices 12 have the same stress information difference, the two wheels 20 move at the same speed. When the two pedal devices 12 have different stress information differences, one of the wheels 20 rotates at a faster speed than the other wheel 20, or the rotational directions of the wheels 20 on both sides are opposite, thereby achieving steering.

In the present embodiment, the first position sensor 13 is an I-shaped first position sensor, and the width of the connecting portion 132 is smaller than the width of the end portion 131 in the left-right direction. In this way, the connecting portion 132 can fix the two front and rear second force receiving portions 1312 to enhance the strength of the first position sensor 13, and the narrower connecting portion 132 can reduce the weight of the first position sensor 13. On the other hand, the first position sensor 13 may have better elasticity to improve sensing sensitivity. Certainly, in other embodiments, the shape of the first position sensor 13 is not limited thereto, and a circular load sensor or the like may be employed.

The pedal device 12 further comprises a lower shell 126 located between the sensor fixing base 125 and the vehicle body 10. In this way, the structural flatness of an outer side of the vehicle body 10 can be improved, and the protection function and aesthetic sense are better.

A foot pad 122 is disposed above the pedal foot board 121, and the foot pad 122 is connected to the lower shell 126 in a closed manner. The foot pad 122 can be made of soft rubber material or the like, so that the wear resistance and friction of the foot pad 122 can be increased, the user's comfort can be improved, and the waterproof and dustproof effect can be improved.

Figure 3:
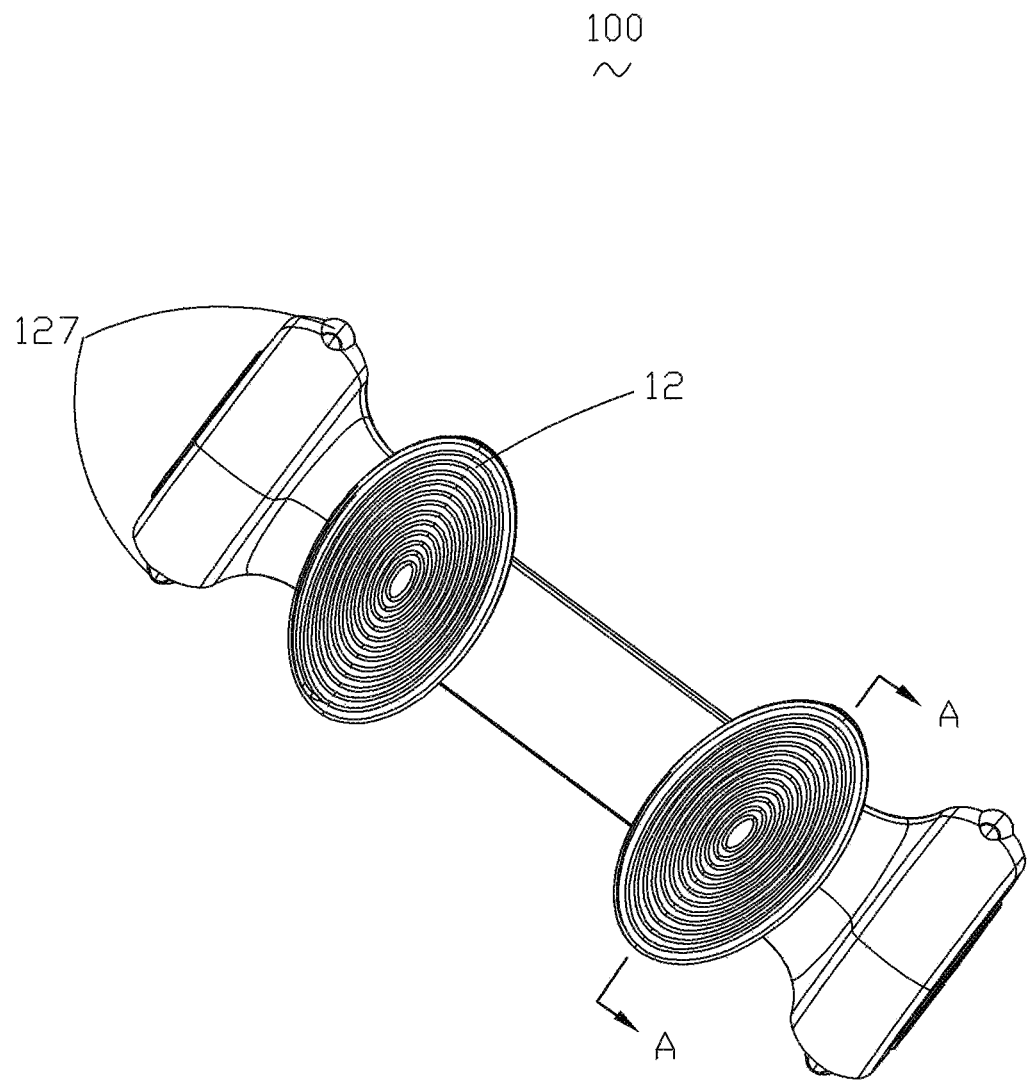
FIG. 3 is a three-dimensional assembled diagram showing the man-machine interaction somatosensory vehicle of the present disclosure from yet another angle.

Referring to FIG. 3, the pedal device 12 is elliptical. In this way, the user's safety can be improved and the appearance is more beautiful. In other embodiments, the pedal device 12 can also have other shapes.

The supporting frame 11 is a tubular shape extending axially along the wheels 20. The pedal device 12 is wider than the width of the supporting frame 11 in the front-rear direction of the vehicle body 10. A bottom of the pedal device 12 is recessed from bottom to top to partially receive the supporting frame 11. With this arrangement, the structural stability of the overall vehicle body 10 can be improved.

A wheel cover 123 is disposed on one side of the pedal foot board 121 for covering the wheel 20, and the wheel cover 123 and the pedal device 12 are separately disposed. In this way, the manufacturing processes of the two can be separated. In other embodiments, the pedal device 12 and the wheel cover 123 can also be integrally extended. In other embodiments, the wheel cover 123 and some parts of the pedal device 12 may also be integrally formed.

The control device 15 comprises a main control board 150 disposed laterally within the tubular supporting frame 11. The tubular shape is not limited to a circular tube, and may also be a long cavity type having other shapes in cross section. In this way, the main control board 150 can better utilize the space of the longitudinal receiving cavity 110 in the tubular supporting frame 11 to improve space utilization. In other embodiments, the main control board 150 may be placed in the supporting frame 11 in other manners.

The power supply 16 is disposed in the supporting frame 11, and the main control board 150 is provided with a battery docking interface 152 for electrically connected to the power supply 16. The power supply 16 is provided with a battery interface 177 for docking the battery docking interface 152. In this way, the power supply 16 and the main control board 150 are docked through a modular interface, which can avoid more cables 211 from passing through, thereby avoiding problems such as aging of the cable 211, and improving safety.

The battery docking interface 152 is located in a middle portion of the main control board 150 in the left-right direction. In this way, the balance of the main control board itself can be improved, and the assembly stability can be improved. In other embodiments, the battery docking interface 152 can also be placed in other positions.

The left and right ends of the main control board 150 are provided with external docking interfaces 151 for electrically connected to the driving devices on both sides, which makes it convenient for the external docking interface 151 to be externally docked with the interface of the driving device and/or the first position sensor 13 to facilitate better modular assembly.

A connector 25 that is electrically connected to the driving device and electrically connected to the external docking interface 151 is provided between the supporting frame 11 and the wheel 20. The connector 25 can be electrically connected to the external docking interface 151, which facilitates better modular assembly between the driving device and the vehicle body 10.

The external docking interface 151 is located at both ends of the power supply 16 in the left-right direction. In this way, the external docking interface 151 can better utilize the remaining space at both ends of the power supply 16 in the supporting frame 11 to facilitate docking with the motor and improve the space utilization inside the supporting frame 11.

The main control board 150 is laterally disposed at a top end inside the supporting frame 11, and the power supply 16 is located below the main control board 150. In this manner, the main control board 150 can be better protected from being squeezed.

Front and rear sides above the power supply 16 are provided with abutting ribs 1790 extending in left and right direction for abutting upward against the main control board 150, and an empty slot 179 is provided between the abutting ribs and is disposed between the main control board 150 and the power supply 16. In this way, not only that the main control board 150 can be better abutted and fixed, and the elements on the main control board 150 can be protected from being squeezed.

In this embodiment, the main control board 150 is elongated along the left-right direction. In this way, the main control board 150 can better utilize the space of the top end inside the tubular supporting frame 11 to improve space utilization. In other embodiments, the main control board 150 can also have other shapes.

The man-machine interaction somatosensory vehicle 100 is provided with a transmission connection element therein, and the transmission connection element comprises a power transmission element, a Hall transmission element, and a temperature transmission element for transmitting a temperature signal. In this way, the temperature transmission element can be configured to transmit the temperature signal of the man-machine interaction somatosensory vehicle 100 to the control device 15. When the temperature of the corresponding element of the man-machine interaction somatosensory vehicle 100 reaches a certain degree, the corresponding protection program such as shutdown can be activated, thereby improving safety of the man-machine interaction somatosensory vehicle 100 when in use.

The transmission element can be a cable or a connecting terminal. In this way, signal transmission can be achieved. It can be understood that the connecting terminal described herein is not limited to a connecting terminal 252 disposed between the power supply 16 and the driving device in the figure, and may be a connecting terminal for replacing the cable elsewhere. The cable described herein is not limited to the cable 211 shown in the drawing, and may be a cable disposed elsewhere.

In different embodiments of the present disclosure, when the transmission element is a cable, it may comprise five Hall lines, two or one temperature line, and three power lines. When the transmission element is a connecting terminal, it may comprise three power terminals, five Hall terminals, two or one temperature terminal. Certainly, in other embodiments, transmission may be carried out partially by wires and partially by terminals. For example, in the embodiment, the connecting terminal 252 can be provided with a power terminal, but not provided with the Hall terminal, and a battery communication line is additionally configured to achieve a corresponding function.

The power supply 16 is disposed in the supporting frame 11. The power supply 16 is provided with a temperature sensor (not shown) therein for monitoring the internal temperature of the power supply 16, and the temperature transmission element is connected to the temperature sensor. In this way, it can be used to sense whether the power supply 16 is overheated, thereby improving the safety when in use.

The wheel axle 21 is disposed between the wheel 20 and the vehicle body 10, and the wheel 20 is rotatably connected to the vehicle body 10 through the wheel axle 21. The driving device is disposed in the wheel 20, and the driving device is a driving motor, and the main control board 150 is provided with a driving circuit (not shown) for controlling the driving device. The wheel axle 21 is provided with the cable 211 therein connected to the driving device, and the cable 211 extends from the wheel axle 21 for connection with a connector 25. In this manner, the power supply, the Hall and the temperature transmission element are disposed between the driving device and the connector 25. In other embodiments, the temperature transmission element may not be disposed between the driving device and the connector 25, that is, the driving device may not be provided with a temperature sensor.

The connector 25 comprises a frame port 251 and the connecting terminal 252 correspondingly connected to the cable 211 in the frame 251.

The power supply 16 is connected to an external docking interface 151, and the external docking interface 151 and the connector 25 are docked with each other. In this way, the connector 25 can be docked with the external docking interface 151, which improves the modular assembly level between the driving device and the power supply 16 and improves safety.

Further, the power supply 16 and the external docking interface 151 are connected through the main control board 150. The power supply 16 and the main control board 150 are provided with a battery docking interface 152 and a battery interface 177 therebetween inserted into each other. The external docking interface 151 is provided on the main control board 150, and the external docking interface 151 is connected to the power supply 16 through the main control board 150. In this way, the modular assembly level between the main control board 150 and the power supply 16 is further improved, and the safety is improved.

The wheel cover 123 is disposed on an outer side of the wheel 20, and the wheel cover 123 is provided with an anti-collision adhesive 127. In this manner, the wheel cover 123 can be better protected during use.

Specifically, the anti-collision adhesive 127 is protruded from an outer side of the wheel cover 123. In this way, the structure is simple and the assembling is easy. In other embodiments, the anti-collision adhesive 127 can also be embedded in the wheel cover 123, and the buffer wear-resistant material different from the wheel cover 123 can be used to improve durability while saving material cost.

As described in FIG. 1, the anti-collision adhesive 127 is located on front and rear sides of the wheel cover 123. In this manner, the material cost is saved. In other embodiments, other parts may also be equipped with anti-collision adhesive 127.

The wheel cover 123 is fixed on the vehicle body 10. The vehicle body 10 comprises the motor fixing base 3 located between the wheel 20 and the supporting frame 11. The motor fixing base 3 is configured to pivotally position the wheel 20.

The motor fixing base 3 extends upward to provide the insertion mounting leg 311 for inserting and fixing the wheel cover 123. A bottom of the wheel cover 123 is provided with a mounting slot 1230 recessed from bottom to top for receiving the insertion mounting leg 311. In this way, the wheel cover 123 can be stably fixed with the motor fixing base 3, and the structure is simple and the assembly is stable.

A fixing rod 1231 protruding from top to bottom and located on the front and rear sides of the mounting slot 1230 is disposed below the wheel cover 123. The motor fixing base 3 is provided with a fixing slot 313 located on front and rear sides of the insertion mounting leg 311 and recessed from top to bottom for inserting, receiving and fixing the fixing rod 1231. In this manner, the stability of the fastening between the wheel cover 123 and the motor fixing base 3 can be enhanced.

Since the size of the supporting frame 11 in the front-rear and/or up-down directions of the vehicle body 10 is smaller than the diameter of the wheel 20 and the supporting frame 11 is a circular tube extending in the axial direction of the wheels 20, the wheel cover 123 is provided with an extension portion 1242 for shielding the wheel cover portion 1241 of the wheel 20 and extending in a shrinking manner from the wheel cover portion 1241 to the supporting frame 11 in a streamlined shape. In this way, the extension portion 1242 can provide a better dustproof and waterproof function between the wheel 20 and the vehicle body 10, and can improve the structural consistency of the overall man-machine interaction somatosensory vehicle 100, and is easy for the user to clean.

An extending tail end of the extension portion 1242 is provided with a mounting notch 124 engaging the supporting frame 11, so as to improve the structural stability of the overall man-machine interaction somatosensory vehicle 100.

The supporting frame 11 is provided with the recessed guide rail 112, and the guide rail 112 is provided with a light strip 4. In this way, the installation is simple; the light strip 4 can make the man-machine interaction somatosensory vehicle 100 have better warning recognition function when in use, such that traffic safety of the user can be improved.

The guide rail 112 extends in the left-right direction and is disposed on the front side and/or the rear side of the supporting frame 11. Thus, the light strip 4 can be disposed on the front side and/or the rear side of the supporting frame 11.

The pedal device fixing bracket 18 for mounting and holding the pedal device 12 is further inserted into the guide rail 112. In such configuration, the pedal device fixing bracket 18 and the light strip 4 can share one guide rail 112, which is convenient for manufacturing.

The left and right ends of the guide rail 112 are inserted with the pedal device fixing brackets 18 for respectively mounting and holding the two left and right pedal devices 12, and the light strip 4 is located between the two pedal device fixing brackets 18. During the assembling process, the light strip 4 can be first inserted into the guide rail 112, and then the pedal device fixing brackets 18 on the two sides are inserted into the guide rails 112 on both sides of the light strip 4 for easy assembly.

The rear side of the light strip 4 is fixed with a fixing strip 41 for inserting into the guide rail 112. In this way, the light strip 4 and the fixing strip 41 can be assembled together after manufacturing separately, which makes it easy for manufacturing and molding the light strip 4.

The guide rail 112 has a T-shaped cross section. The fixing strip 41 has a T-shaped cross section. In this way, the fixing strip 41 and the guide rail 112 are closely matched to improve the stability of the fastening between the light strip 4 and the supporting frame 11. In other embodiments, the cross section may also have other shapes as long as it is ensured that the fixing strip 41 and the guide rail 112 do not fall off after insertion.

The supporting frame 11 is a circular tube extending axially along the wheel 20, and the guide rail 112, the pedal device fixing bracket 18 and the light strip 4 are all located in the upper half portion of the supporting frame 11. In this manner, the supporting frame 11 can provide better upward support to the pedal device fixing bracket 18. In other embodiments, the guide rail 112, the pedal device fixing bracket 18 and the light strip 4 may be located in the middle or lower half portion of the supporting frame 11.

The supporting frame 11 is provided with a longitudinal power supply 16 therein extending in the axial direction of the wheel 20. The power supply 16 comprises a battery case 17, and the battery case 17 and the supporting frame 11 are made of metal. In this way, the metallic battery case 17 can make the power supply 16 an explosion-proof battery, and the metallic supporting frame 11 can further provide protection for the explosion-proof power supply 16, and the double metallic material protection can greatly improve the safety of the man-machine interaction somatosensory vehicle 100, and avoid the safety accident caused by the explosion of the power supply 16.

In this embodiment, the supporting frame 11 is an aluminum tube. In other embodiments, the supporting frame 11 can also be other metal materials.

The battery case 17 and the supporting frame 11 are provided with a position-limiting recess 170 and a position-limiting protrusion 111 therebetween engaging each other. The arrangement is advantageous for the positioning between the power supply 16 and the supporting frame 11, which is less likely to cause displacement between each other, improves overall stability, and can avoid reverse installation in assembling.

The size of the supporting frame 11 in the front-rear and/or up-down directions of the vehicle body 10 is smaller than the diameter of the wheel 20. With this arrangement, the vehicle body 10 has a smaller size in the front-rear and/or the up-down directions, which saves material cost and is easy to be carried.

The supporting frame 11 is a circular tube extending axially along the wheel 20. With this arrangement, the supporting frame 11 has a smaller surface area on basis of the same capacity, thereby saving material cost and allowing the vehicle body 10 to be more compact and lighter. On the other hand, the supporting frame 11 with a smooth surface is less likely to cause damage and destruction to the user or surrounding objects. In other embodiments, the cross section of the supporting frame 11 and the elongated power supply 16 along the wheel axle 21 may also be rectangular, other polygonal, elliptical or other irregular shapes. The elongated power supply 16 has a circular cross-sectional area along the axial direction of the wheel 20, and is engaged with the supporting frame 11.

In the embodiment, the pedal device 12 and the supporting frame 11 are fixedly connected. The first position sensor 13 can be configured to sense stress information on the pedal device 12.

In other embodiments, the first position sensor 13 can also be configured to sense whether there is a user on the pedal device 12 to control the wheels 20 to start or stop. With this setting, it is not necessary to provide an additional sensing switch, thereby simplifying the structure of the vehicle body 10. Certainly, in other embodiments, the sensing switch can also be set independently.

The driving device can be disposed in the wheel 20, so that the driving device can be built in the wheel 20 with existing volume, and the space utilization is high; in other embodiments, the driving device can also be disposed inside the supporting frame 11. In this manner, the configuration can be applied when the wheel 20 is relatively small.

The pedal device 12 comprises the pedal foot board 121 and the foot pad 122 located above the pedal foot board 121. The first position sensor 13 is disposed under the pedal foot board 121. In this manner, the user can pedal on the foot pad 122 to meet the specific anti-slippery requirement or improve the pedaling comfort.

The pedal device 12 is outwardly inclined compared to the front-rear direction. In this way, the configuration can be adapted to the standing posture that the distance between the two toes of the user is wider than the distance between the two heels, thereby increasing user's comfort. In other embodiments, the pedal device 12 may not be inclined.

In summary, in the man-machine interaction somatosensory vehicle 100 of the present disclosure, there is only one tubular supporting frame 11 between the two wheels 20 for providing a supporting function, and the pedal device 12 is independently disposed on the supporting frame 11. There is no need to use two rotatably connected mechanisms to respectively set the pedal device 12. As compared with existing balancing vehicle or twisting vehicle on the market, the present disclosure has a simple structure and the vehicle body 10 is integrally formed with good expandability, and steering rod or the vehicle body separating and rotating structure is reduced, such that the vehicle body is more robust.

Although the present disclosure has been disclosed in the above preferred embodiments, it is not intended to limit the disclosure, and the disclosure may be changed or modified by persons skilled in the art without departing from the spirit and scope of the disclosure. The scope of present disclosure is subject to the scope of the claims.

What is claimed is:

1. A man-machine interaction somatosensory vehicle, comprising a vehicle body and two wheels disposed on the vehicle body, the wheels being rotatable around the vehicle body in a radial direction; wherein the vehicle body further comprises a supporting frame, two pedal devices disposed on the supporting frame, a control device, and a driving device configured to drive the wheels, the supporting frame is an integral structure formed as one piece, and is rotatably connected to the wheels, each of the pedal devices comprises a pedal foot board and a first position sensor located between the pedal foot board and the supporting frame for sensing stress information of each of the pedal devices, the control device controls the driving device to drive the wheels to move or steer according to the stress information of the two pedal devices,
wherein the supporting frame is provided with a recessed guide rail, the guide rail is inserted with a pedal device fixing bracket for mounting and holding the pedal device, the guide rail extends in a left-right direction and is disposed on a front side and/or a rear side of the supporting frame, left and right ends of the guide rail are inserted with the pedal device fixing brackets for mounting and holding the two pedal devices on left and right respectively, a single-sided guide rail for inserting the two pedal device fixing brackets on left and right is integrally extended or independent of each other, the guide rail has a T-shaped cross section, each of the pedal device fixing brackets comprises an insertion portion laterally inserted into the guide rail and a mounting portion extending outwardly from the guide rail for mounting and holding the pedal device, the mounting portion is provided with a fastening hole for fastening the pedal device, a supporting wing portion extending between the mounting portion and the insertion portion and attached to the supporting frame in an upward and/or a downward direction is provided.

2. The man-machine interaction somatosensory vehicle of claim 1, wherein each of the first position sensors comprises two sensing element regions distributed at two portions of one of the pedal foot boards, each of the first position sensors senses stress information of the two portions of the pedal foot board through the two sensing element regions, and obtains the stress information of each of the pedal devices.

3. The man-machine interaction somatosensory vehicle of claim 2, wherein each of the sensing element regions is provided with a first force receiving portion and a second force receiving portion, the first force receiving portion of each of the sensing element regions abuts against one of the supporting frame and the pedal foot board, and the second force receiving portion abuts against the other one of the supporting frame and the pedal foot board.

4. The man-machine interaction somatosensory vehicle of claim 3, wherein each of the first position sensors comprises a front end portion and a rear end portion, and a connecting portion connecting the front and rear end portions, each of the front and rear end portions comprises the first force receiving portion, the second force receiving portion, and the sensing element region between the first force receiving portion and the second force receiving portion.

5. The man-machine interaction somatosensory vehicle of claim 3, wherein a bottom surface of one of the first force receiving portion and the second force receiving portion abutting against the pedal foot board is in suspended arrangement.

6. The man-machine interaction somatosensory vehicle of claim 5, wherein each of the pedal devices further comprises a sensor fixing base mounted on the supporting frame, one of the first force receiving portion and the second force receiving portion abutting against the supporting frame abuts against the supporting frame through the sensor fixing base.

7. The man-machine interaction somatosensory vehicle of claim 6, wherein each of the pedal devices further comprises a lower shell located between the sensor fixing base and the vehicle body, a foot pad is disposed above the pedal foot board, and the foot pad is connected to the lower shell in a closed manner.

8. The man-machine interaction somatosensory vehicle of claim 6, wherein the first force receiving portion of each of the sensing element regions abuts against a corresponding one of the pedal foot boards, and the second force receiving portion abuts against the sensor fixing base, a bottom surface of the first force receiving portion is suspended.

9. The man-machine interaction somatosensory vehicle of claim 8, wherein a first gap is formed between the pedal foot board and the sensing element region, a second gap is formed between the sensor fixing base and the sensing element region.

10. The man-machine interaction somatosensory vehicle of claim 1, wherein the first position sensor is a stress sensor.

11. The man-machine interaction somatosensory vehicle of claim 1, wherein the first position sensor is configured to sense whether there is a user on the pedal device to control the wheels to start or stop.

12. The man-machine interaction somatosensory vehicle of claim 1, further comprising a second position sensor for sensing tilt information of the supporting frame relative to the wheels, wherein the second position sensor comprises a gyroscope, an acceleration sensor, and/or a photoelectric sensor.

13. The man-machine interaction somatosensory vehicle of claim 1, wherein the supporting frame is provided with a longitudinal power supply therein extending in an axial direction of the wheels, the power supply comprises a battery case, the battery case and the supporting frame are made of metal, and a position-limiting recess and a position-limiting protrusion matched with each other are provided between the battery case and the supporting frame.

14. The man-machine interaction somatosensory vehicle of claim 1, wherein the supporting frame is a tubular shape extending axially along the wheels, and the guide rail and the pedal device fixing bracket are both located in an upper half portion of the supporting frame.

15. The man-machine interaction somatosensory vehicle of claim 1, wherein a wheel axle is disposed between the wheel and the vehicle body, the wheels is rotatably connected to the vehicle body through the wheel axle, a center of gravity of the vehicle body is lower than the wheel axle, one end of the wheel axle is connected to the wheels, and the other end of the wheel axle is connected with a wheel axle fixing board, and the wheel axle fixing board is fixed to the vehicle body.

16. The man-machine interaction somatosensory vehicle of claim 15, wherein the wheel axle is fixed on an upper half portion of the wheel axle fixing board, a lateral end of the supporting frame is provided with a motor fixing base for fixedly engaging the wheel axle fixing board, and a center of gravity of the motor fixing base is lower than the wheel axle, the wheel axle fixing board is perpendicular to a wheel axle direction, and the driving device is disposed in the wheel, and the wheel axle is provided with a cable connecting the driving device, and the cable extends out of the wheel axle fixing board to be connected to the control device and/or a power supply.

17. The man-machine interaction somatosensory vehicle of claim 16, wherein a sealing gasket is disposed between the wheel axle fixing board and the motor fixing base, the supporting frame is provided with a receiving cavity for inserting and engaging the motor fixing base, and the motor fixing base comprises an insertion end for inserting and positioning in the receiving cavity and a cover part connected to the insertion end for sealing an outer side of the receiving cavity, a power supply is disposed in the receiving cavity, and the motor fixing base is provided with a positioning rod laterally protruded for abutting against the power supply in the receiving cavity, a wheel cover is disposed above the wheel, and the cover part of the motor fixing base extends upward to form an insertion mounting leg for inserting and fixing the wheel cover, a position-limiting protrusion and a position-limiting recess extending left and right and matching each other are provided between a receiving cavity of the vehicle body and the insertion end of the motor fixing base, and the motor fixing base is provided with a recessed receiving slot for receiving and holding the wheel axle fixing board.

18. The man-machine interaction somatosensory vehicle of claim 1, wherein the control device comprises a main control board disposed laterally within the tubular supporting frame, a power supply is disposed in the supporting frame, and the main control board is provided with a battery docking interface for electrically connecting to the power supply, and the power supply is provided with a battery interface for docking the battery docking interface.

19. The man-machine interaction somatosensory vehicle of claim 18, wherein left and right ends of the main control board are provided with an external docking interface for electrically connecting to the driving devices and/or the first position sensors on two sides, a connector electrically connected to the driving device and electrically connected to the external docking interface is disposed between the supporting frame and the wheels, and the external docking interface is located at both ends of the power supply in the left-right direction.

20. The man-machine interaction somatosensory vehicle of claim 18, wherein the main control board is laterally disposed at a top end of the supporting frame, and the power supply is located below the main control board.

21. The man-machine interaction somatosensory vehicle of claim 18, wherein front and rear sides above the power supply are provided with abutting ribs extending in left and right for abutting upward against the main control board, and an empty slot is provided between the abutting ribs and is disposed between the main control board and the power supply.

22. The man-machine interaction somatosensory vehicle of claim 1, wherein the man-machine interaction somatosensory vehicle is provided with a transmission element, and the transmission element comprises a power transmission element, a Hall connection element, and a temperature connection element for transmitting a temperature signal, a power supply is disposed in the supporting frame, and a temperature sensor for monitoring an internal temperature of the power supply is disposed inside the power supply, and the temperature transmission element is connected to the temperature sensor, and a wheel axle is disposed between the wheel and the vehicle body, and the wheels are rotatably connected to the vehicle body through the wheel axle, and the driving device is disposed in the wheels, and the wheel axle is provided with a cable connected to the driving device, and the cable extends out of the wheel axle for connecting to a connector.

* * * * *